US011594220B2

(12) United States Patent
Yoon et al.

(10) Patent No.: US 11,594,220 B2
(45) Date of Patent: Feb. 28, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Hyundon Yoon, Suwon-si (KR); Yongjun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 17/198,923

(22) Filed: Mar. 11, 2021

(65) Prior Publication Data
US 2021/0350801 A1 Nov. 11, 2021

(30) Foreign Application Priority Data
May 7, 2020 (KR) ........................ 10-2020-0054741

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC ..................................................... G10L 15/22
See application file for complete search history.

(56) References Cited

U.S. PATENT DOCUMENTS 9,318,107 B1 4/2016 Sharifi
9,775,113 B2 9/2017 Sun et al.
(Continued)

FOREIGN PATENT DOCUMENTS

JP 7-271392 A 10/1995
JP 3838029 B2 10/2006
(Continued)

OTHER PUBLICATIONS

International Search Report (PCT/ISA/210) dated Jul. 22, 2021 by the International Searching Authority in International Application No. PCT/KR2021/003865.
(Continued)

*Primary Examiner* — Ibrahim Siddo
(74) *Attorney, Agent, or Firm* — Sughrue Mion, PLLC

(57) ABSTRACT

An electronic apparatus includes a memory, a communication interface, and a processor configured to receive, from an external device through the communication interface, information corresponding to a user voice input obtained by the external device, perform a function corresponding to a trigger recognition on the user voice input based on trigger information corresponding to a trigger stored in the memory, and based on the user voice input not including the trigger corresponding to the trigger information based on the trigger recognition, perform a function corresponding to a voice recognition on the user voice input based on the information corresponding to the user voice input obtained by the external device, wherein the information corresponding to
(Continued)

the user voice input obtained by the external device includes similarity information between the user voice input obtained by the external device and the trigger information.

20 Claims, 23 Drawing Sheets

(56) References Cited

U.S. PATENT DOCUMENTS

| | | | |
|---|---|---|---|
| 10,192,557 | B2 | 1/2019 | Lee et al. |
| 10,636,414 | B2 | 4/2020 | Tsunoo et al. |
| 11,132,991 | B2 | 9/2021 | Park et al. |
| 11,158,326 | B2 | 10/2021 | Lee et al. |
| 11,200,897 | B2 | 12/2021 | Yi et al. |
| 2016/0156712 | A1* | 6/2016 | Beckett .............. H04L 65/1094 709/217 |
| 2016/0217795 | A1 | 7/2016 | Lee et al. |
| 2018/0137857 | A1 | 5/2018 | Zhou et al. |
| 2019/0027130 | A1 | 1/2019 | Tsundoo et al. |
| 2019/0228781 | A1 | 7/2019 | Lee et al. |
| 2019/0251963 | A1 | 8/2019 | Li et al. |
| 2019/0385594 | A1 | 12/2019 | Park et al. |
| 2019/0392834 | A1* | 12/2019 | Yi .............................. G01S 5/20 |
| 2020/0074988 | A1 | 3/2020 | Park et al. |
| 2022/0044690 | A1 | 2/2022 | Lee et al. |

FOREIGN PATENT DOCUMENTS

| | | |
|---|---|---|
| KR | 10-2012-0083104 A | 7/2012 |
| KR | 10-1385012 B1 | 4/2014 |
| KR | 10-2016-0055162 A | 5/2016 |
| KR | 10-2017-0093629 A | 8/2017 |
| KR | 10-2018-0039135 A | 4/2018 |
| KR | 10-2019-0075870 A | 7/2019 |
| KR | 10-2019-0084003 A | 7/2019 |
| KR | 10-2019-0096860 A | 8/2019 |
| KR | 10-2019-0096861 A | 8/2019 |
| WO | 2017/044629 A1 | 3/2017 |
| WO | 2017/154282 | 9/2017 |

OTHER PUBLICATIONS

Written Opinion (PCT/ISA/237) dated Jul. 22, 2021 by the International Searching Authority in International Application No. PCT/KR2021/003865.

* cited by examiner

FIG. 12

| | FIRST RECOGNITION | | SELECTION | | SECOND RECOGNITION | | |
|---|---|---|---|---|---|---|---|
| | SIMILARITY | THRESHOLD | RECOGNITION RESULT | CHARACTERISTIC INFORMATION | SELECTION RESULT | SIMILARITY | THRESHOLD | RECOGNITION RESULT |
| DEVICE 1 | 80% | 70% | YES | 62dB | YES | 60% | 65% | NO |
| DEVICE 2 | 70% | 60% | YES | 60dB | NO | | | |
| DEVICE 3 | 60% | 60% | YES | 58dB | NO | | | |
| ... | | | | | | | | |
| DEVICE N | 30% | 50% | NO | 50dB | NO | | | |

~1205

ELECTRONIC APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2020-0054741, filed on May 7, 2020, in the Korean Intellectual Property Office, the disclosure of which is incorporated by reference herein in its entirety.

BACKGROUND

1. Field

The disclosure relates to an electronic apparatus and a control method thereof and, more particularly, to an electronic apparatus for receiving a user voice and performing a voice recognition thereon, and a control method thereof.

2. Description of Related Art

An electronic apparatus may receive a voice input and recognize a trigger, wake-up word, or other word or phrase that may trigger subsequent voice recognition of a command, query, or other voice input, and may perform the voice recognition operation if the initial trigger is recognized.

If a plurality of electronic apparatuses are included in one network, such as a home network, the plurality of electronic apparatuses may utilize the same trigger. Therefore, when the user utters a voice trigger, more than one electronic apparatus may recognize the user voice and attempt to perform voice recognition.

The plurality of electronic apparatuses may perform trigger recognition to remove false recognition. When a plurality of electronic apparatuses perform trigger recognition, there may be a problem that an activation or a wake-up of all the electronic apparatuses may occur.

After trigger recognition is performed in each of the plurality of electronic apparatuses, one electronic apparatus of the plurality of electronic apparatuses may perform additional trigger recognition operations.

When additional trigger recognition fails in the one electronic apparatus, there may be a problem in that a non-response state may occur in which any of the plurality of electronic apparatuses does not react to the user voice input.

SUMMARY

This disclosure is provided to address at least the above-mentioned problems and/or disadvantages and to provide at least the advantages described below.

Accordingly, an aspect of the disclosure is to provide an electronic apparatus for performing a voice recognition in consideration of trigger recognition information received by an electronic device when a trigger recognition fails, and a control method thereof.

According to an embodiment, an electronic apparatus includes a memory, a communication interface, and a processor configured to receive, from an external device through the communication interface, information corresponding to a user voice input obtained by the external device, perform a function corresponding to a trigger recognition on the user voice input based on trigger information corresponding to a trigger stored in the memory, and based on the user voice input not including the trigger corresponding to the trigger information based on the trigger recognition, perform a function corresponding to voice recognition on the user voice input based on the information corresponding to the user voice obtained by the external device, wherein the information corresponding to the user voice input obtained by the external device includes similarity information between the user voice obtained by the external device and the trigger information.

According to an embodiment, a method of controlling an electronic apparatus includes receiving, from an external device, information corresponding to a user voice input obtained by the external device, performing a function corresponding to a trigger recognition on the user voice input based on trigger information corresponding to a trigger, and based on determining the user voice input does not include the trigger corresponding to the trigger information based on the trigger recognition, performing a function corresponding to a voice recognition on the user voice input based on the information corresponding to the user voice obtained by the external device, wherein the information corresponding to the user voice input obtained by the external device comprises similarity information between the user voice input obtained by the external device and the trigger information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 illustrates a table of a first trigger recognition and a second trigger recognition result;

FIG. 13 illustrates a flowchart of performing a voice recognition based on identification whether an external device determines that user voice and trigger information are similar;

FIG. 14 illustrates a flowchart of performing a voice recognition based on whether an external device determines the user voice and trigger information are similar;

DETAILED DESCRIPTION

Figure 1:
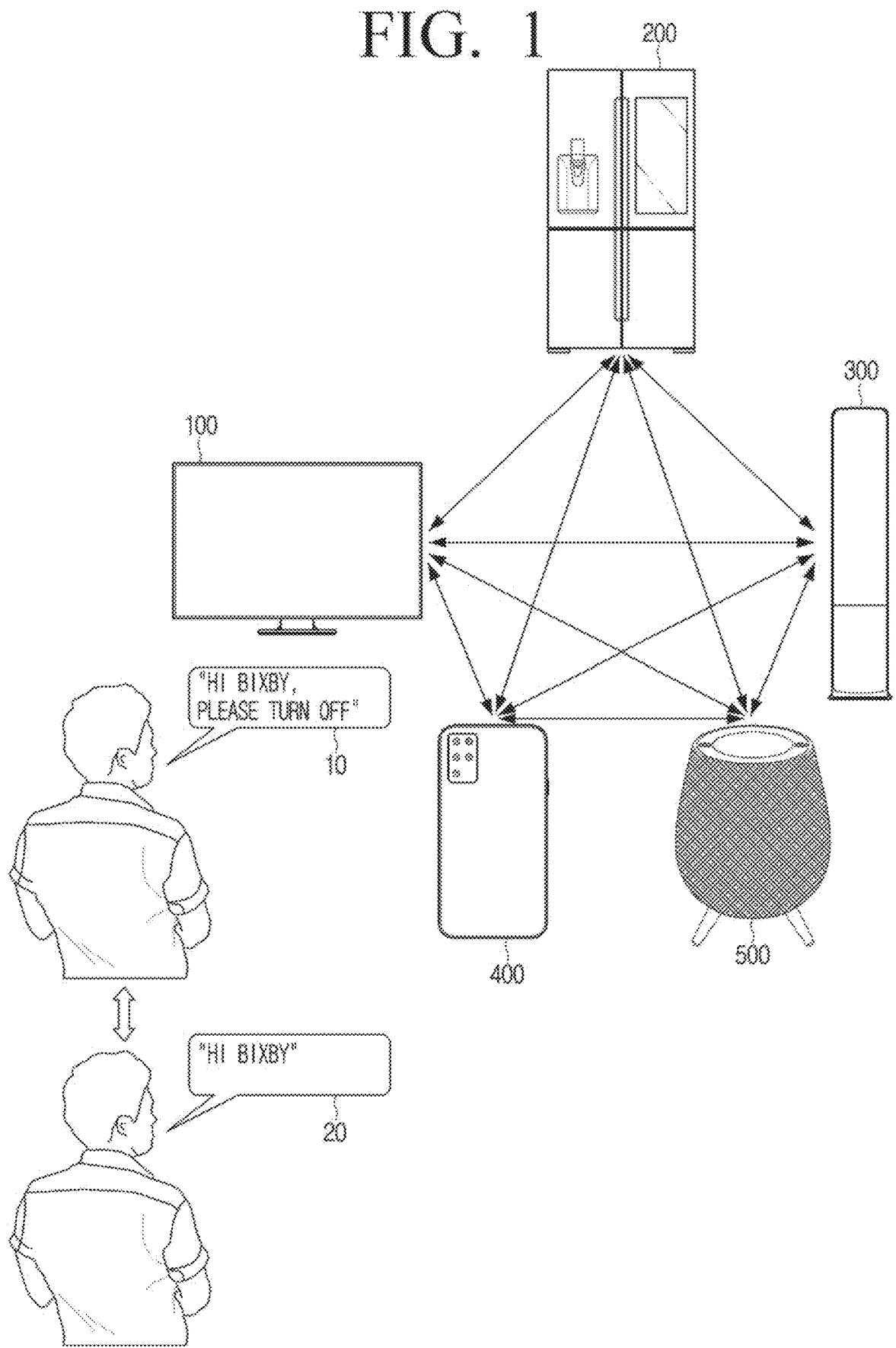
FIG. 1 illustrates a diagram of selecting an apparatus to perform a voice recognition from among a plurality of apparatuses.

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through an intervening third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using an electronic apparatus or an artificial intelligence electronic apparatus using an electronic apparatus (e.g., artificial intelligence electronic apparatus).

The operations of the disclosure may be performed by a machine-learning-based recognition system, and in the disclosure, a deep-learning-based recognition system is described as a classification system by a series of machine learning algorithms based on neural networks.

The deep-learning-based recognition system may include at least one classifier, and the classifier may correspond to one or a plurality of processors.

The electronic apparatus may be a classification system by a series of machine learning algorithms based on neural networks, and may use a deep-learning-based recognition system.

FIG. 1 illustrates a diagram of selecting an apparatus to perform a voice recognition from among a plurality of apparatuses.

Referring to FIG. 1, there may be a plurality of electronic apparatuses capable of receiving a user voice (or a user voice input) using a microphone. The plurality of apparatuses may be an electronic apparatus 100, a first external device 200, a second external device 300, a third external device 400, and a fourth external device 500. The electronic apparatus 100, the first external device 200, the second external device 300, a third external device 400, and a fourth external device 500 may receive (or obtain) a user's uttered voice and may perform a function corresponding to a trigger recognition based on the received voice. Here, the trigger may be a wake-up word corresponding to each device. The plurality of devices may be various devices such as a television, a refrigerator, an air conditioner, a smartphone, an artificial intelligence (AI) speaker, or the like. The AI speaker may refer to a speaker capable of controlling an electronic appliance and an Internet of Things (IoT) device by a voice input and recognition. The plurality of devices are not necessarily limited to the devices described above, and various devices may be applied according to implementation examples.

The plurality of devices 100 to 500 may be connected to each other through various communication methods and networks.

According to one embodiment, a plurality of devices 100 to 500 may be directly connected. The electronic apparatus 100 may be connected to the first external device 200 by a peer-to-peer configuration. Here, the peer-to-peer communication method may be one of Wi-Fi direct, Bluetooth (BT) or infrared. Each of the plurality of devices 100 to 500 may be individually connected to an external server. Alternatively, or in addition, each of the plurality of devices 100 to 500 may be connected to each other through an access point, routers, and other networking infrastructure devices.

According to another embodiment, a plurality of devices 100 to 500 may communicate in a manner to distinguish a master device and a slave device. Here, the master device may refer to a separate hub device (or a connection hub). According to a user's setting or a preset condition of the user, one of the plurality of devices 100 to 500 may be identified as the master device or may communicate using a separate connection hub. For example, the plurality of devices 100 to 500 may not perform direct communication with each other and may communicate through one master device or a separate connection hub. Only the master device (or a separate connection hub) may be connected to an external server, or each of a plurality of devices 100 to 500 may be connected to an external server.

According to another embodiment, each of the devices 100 to 500 may communicate by being directly connected to an external server. Each of the devices may be connected to an external server and may perform a device-to-device communication through an external server.

Each of the plurality of devices 100 to 500 may receive (or obtain) a user voice through a microphone included in the plurality of devices 100 to 500. In one example, each of the plurality of devices 100 to 500 may transmit the received user voice to all other devices. In another example, each of the plurality of devices 100 to 500 may transmit the received user voice to the master device (or a separate connection hub). In another example, each of the plurality of devices 100 to 500 may transmit the received user voice to an external server.

An operation performed by the plurality of devices 100 to 500 according to whether a voice uttered by as user includes a control command will be described.

According to a first embodiment 10, the trigger is "hi bixby" and the user utters "hi bixby, please turn off" The plurality of devices 100, 200, 300, 400, and 500 may receive user voice and perform trigger recognition. The user voice may include a trigger and a control command. In a user voice, "hi bixby" may be a trigger, and "please turn off" may be a control command. The plurality of devices 100, 200, 300, 400, and 500 may compare the trigger included in the received user voice with trigger information stored in each device.

According to a second embodiment 20, the trigger may be "hi bixby," and the user may utter "hi bixby." Unlike the first embodiment 10, the user may only utter a trigger, and the plurality of devices 100, 200, 300, 400, and 500 may receive the user voice and perform trigger recognition. Specifically, the plurality of devices 100, 200, 300, 400, and 500 may compare the trigger information stored in each device with the trigger included in the received user voice. Accordingly, the plurality of devices 100, 200, 300, 400, and 500 may determine whether the user voice input includes the trigger ("hi bixby") based on comparing the user voice input with the trigger information stored in each device. If a target device is determined to respond to the user voice in the second embodiment 20, the target device may provide a user with a sound or a user interface (UI) to inform the user of a content that the device itself is determined as a device for performing a function corresponding to a voice recognition. When the target device is determined, the target device may provide the user with a sound or a UI which guides the user to utter the control command.

It is assumed that the operation of the plurality of devices performing voice recognition according to the first embodiment 10 includes both trigger and control commands for user voice. However, according to the second embodiment 20, the operation of the plurality of devices may be divided into a first user voice to utter a trigger only and a second user voice to utter a control command. If the target device is identified according to the first user voice, the target device may provide the user with information to guide utterance of the second user voice.

According to the first embodiment 10 and the second embodiment 20, a control command is described, but the control command may refer to a user's utterance (subsequent utterance) in addition to the trigger word. Accordingly, the control command may be implemented as a simple word, a sentence, a search keyword, a conversational statement, a question or inquiry, or the like, as well as a command for controlling the target.

The operation of comparing trigger information may be a trigger recognition operation. The trigger recognition may be described as a trigger comparison, and the trigger recognition operation may be described as a trigger comparison operation. Since the trigger recognition operation may simply refer to a comparison operation, the plurality of devices may obtain result information of the trigger recognition operation.

The result information of the trigger recognition operation may include information about whether the compared user voice has been identified as including a trigger. In other words, the result information of the trigger recognition operation may include information indicating whether the user voice input is determined to include the trigger ("hi bixby"). The result information of the trigger recognition operation may include information about success or failure of the trigger recognition of the user voice. The success of the trigger recognition may indicate that the trigger ("hi bixby") is included in the user voice input. The failure of the trigger recognition may indicate that the trigger ("hi bixby") is not included in the user voice input. Accordingly, the result information of the trigger recognition operation may include whether the user voice includes the trigger recognition. In an alternative embodiment, the failure of the trigger recognition may indicate that the device is unable to determine whether the user voice input includes the trigger ("hi bixby"), for example due to background noise.

The trigger recognition operation may be performed more than once. The trigger recognition operation is additionally performed to lower a false recognition rate. When the trigger recognition occurs once, false recognition may increase and thus the trigger recognition may be divided into two stages. In order to distinguish a two-stage trigger recognition, a primary trigger recognition (primary trigger comparison or first trigger recognition) and a secondary trigger recognition (secondary trigger comparison or second trigger recognition) will be described. The primary trigger recognition may refer to trigger recognition performed in each of the plurality of devices. The secondary trigger recognition may be a trigger recognition operation performed after the primary trigger recognition is successful. If a primary trigger recognition fails in a specific device, a secondary trigger recognition may not be performed in a specific device.

The reason for distinguishing the primary trigger recognition and the secondary trigger recognition may be to reduce resources. The primary trigger recognition may have a relatively small resource, and the secondary trigger recognition may have a relatively large resource. The primary trigger recognition may be performed in a plurality of devices 100 to 500, but the secondary trigger recognition may be performed in only one device. Accordingly, in an embodiment in which a secondary trigger recognition is performed in one device, a total resource may be smaller than an embodiment in which a secondary trigger recognition occurs throughout a plurality of devices 100 to 500.

Distinguishing the primary trigger recognition and the secondary trigger recognition also prevents delay according to the server association. The secondary trigger recognition may be performed on a server corresponding to each of the plurality of devices 100 to 500. When the secondary trigger recognition is performed on each of the plurality of devices 100 to 500, data may be transmitted to each server to receive the trigger recognition identification result from the server. Here, a time difference may be generated in each server to receive and compare a trigger recognition identification result and a processing speed be reduced. Therefore, in an embodiment, the secondary trigger recognition may be performed in one device by distinguishing the primary trigger recognition and the secondary trigger recognition.

The device for performing the primary trigger recognition will be described.

According to one embodiment, the primary trigger recognition may be performed by each of the plurality of devices 100 to 500. Here, each of the plurality of devices 100 to 500 may perform a primary trigger recognition for the received user voice without utilizing an external server. Each of the plurality of devices 100 to 500 may transmit result information (hereinafter, primary trigger recognition result information) for the primary trigger recognition to other devices 100 to 500. In one example, the plurality of devices 100 to 500 may transmit the primary trigger recognition result information directly to other devices 100 to 500. In another example, a plurality of devices 100 to 500 may transmit primary trigger recognition result information to other devices 100 to 500 through a master device (or a separate connection hub). In another example, a plurality of devices 100 to 500 may transmit primary trigger recognition result information to an external server.

According to another embodiment, the primary trigger recognition may be performed by a master device. The plurality of devices 100 to 500 may transmit the received user voice to the master device. The master device may perform a primary trigger recognition with respect to user voices received from each of the plurality of devices 100 to 500. There may be various methods for processing the result information after the primary trigger recognition is performed on the master device. In one example, the master device may transmit the primary trigger recognition result information to all the plurality of devices 100 to 500. In another example, the master device may store the primary trigger recognition result information on the master device itself. In another example, the master device may transmit primary trigger recognition result information to an external server. The external server may store the primary trigger recognition result information received from the master device.

According to a still another embodiment, the primary trigger recognition may be performed on an external server.

In one example, a plurality of devices 100 to 500 may transmit received user voice directly to an external server. The external server may perform primary trigger recognition on user voice received from a plurality of devices 100 to 500. The external server may transmit the primary trigger recognition result information to each of the plurality of devices 100 to 500. Since the external server performs primary trigger recognition on the user voice received in each of the plurality of devices 100 to 500, multiple primary trigger recognition result information may be obtained and the primary trigger recognition result information transmitted to the plurality of devices 100 to 500 may be different. The external server may transmit the primary trigger recognition result information directly to the plurality of devices 100 to 500 or transmit the primary trigger recognition result information through the master device. The external server may transmit the primary trigger recognition result information to the plurality of devices 100 to 500 directly, but according to an embodiment, the primary trigger recognition result information may be transmitted to the master device to store the primary trigger recognition result information in the master device itself or the primary trigger recognition result information may be stored by an external server.

In another example, a plurality of devices 100 to 500 may transmit a user voice received at the master device and the master device may transmit the received user voice back to the external server. The external server may perform primary trigger recognition on the user voice received from the master device. The external server may transmit the primary trigger recognition result information to each of the plurality of devices 100 to 500. The external server may transmit the primary trigger recognition result information directly to the plurality of devices 100 to 500 or transmit the primary trigger recognition result information through the master device. Though the external server may transmit primary trigger recognition result information to the plurality of devices 100 to 500, the primary trigger recognition result information is transmitted to the master device to be stored at the master device or the external server itself stores the primary trigger recognition result information.

Database information related to the user voice received in each of the plurality of devices 100 to 500 may be stored in various manners. The database information related to the user voice may refer to feature information corresponding to the user voice. The feature information may refer to analysis information of user voice obtained in each of the plurality of devices. The feature information may include at least one of a size value of the user voice obtained in each device, an orientation angle value of each device and user voice, or a distance value between each device and a point in time at which the user voice is uttered, in addition to various data relative to the user voice. In one example, each of the plurality of devices 100 to 500 may transmit database information related to user voice to other devices 100 to 500. In another example, the plurality of devices 100 to 500 may transmit database information related to user voice to the master device. The master device may store database information related to the received user voice on the master device itself or transmit the information to an external server for storage on the external server. In another example, the plurality of devices 100 to 500 may transmit database information related to user voice to the server. The server may store database information related to user voice received from a plurality of devices 100 to 500.

When the secondary trigger recognition is performed based on the primary trigger recognition result information, the secondary trigger recognition may be performed by various methods.

According to one embodiment, the secondary trigger recognition may be performed on any one of the plurality of devices 100 to 500. Since the secondary trigger recognition is performed on one device unlike the primary trigger recognition, the plurality of devices 100 to 500 may determine the device to perform the secondary trigger recognition based on the primary trigger recognition result information, and the secondary trigger recognition may be performed on the determined device. The device performing the secondary trigger recognition is assumed to be a specific device. In one example, the specific device may transmit the secondary trigger recognition result information to all the plurality of devices 100 to 500. In another example, the specific device may transmit the secondary trigger recognition result information to the master device. In another example, a specific device may transmit the secondary trigger recognition result information to an external server.

According to another embodiment, the secondary trigger recognition may be performed on a master device. The master device may perform secondary trigger recognition directly without utilizing an external server. The master device may perform a secondary trigger recognition with respect to a user voice of one of the plurality of received user voices. The master device may obtain secondary trigger recognition result information. As an example, the master device may transmit the obtained secondary trigger recognition result information to the plurality of devices 100 to 500. In another example, the master device may store the obtained secondary trigger recognition result information in the master device. In another example, the master device may transmit the acquired secondary trigger recognition result information to an external server.

According to an embodiment, the secondary trigger recognition may be performed on an external server. Here, the external server may perform a secondary trigger recognition on a user voice of one of the plurality of received user voices.

In one example, a plurality of devices 100 to 500 may transmit received user voice directly to an external server. The external server may perform a secondary trigger recognition on the user voice. The external server may transmit the secondary trigger recognition result information to each of the plurality of devices 100 to 500. The external server may transmit the secondary trigger recognition result information directly to the plurality of devices 100 to 500 or transmit the secondary trigger recognition result information through the master device. The external server may transmit the secondary trigger recognition result information to the plurality of devices 100 to 500, but according to an embodiment, the secondary trigger recognition result information may be transmitted to the master device to be stored in the master device itself, or the external server itself may be implemented to store secondary trigger recognition result information.

In another example, a plurality of devices 100 to 500 may transmit a received user voice to the master device and the master device may transmit the received user voice back to the external server. The external server may perform secondary trigger recognition on user voice received from the master device. The external server may transmit the secondary trigger recognition result information to each of the plurality of devices 100 to 500. The external server may transmit the secondary trigger recognition result information directly to the plurality of devices 100 to 500 or may transmit the secondary trigger recognition result information through the master device. The external server may transmit secondary trigger recognition result information directly to the plurality of devices 100 to 500, but according to an embodiment, the secondary trigger recognition result information may be transmitted to the master device to be stored in the master device itself, or the external server itself may be implemented to store the secondary trigger recognition result information.

There may be various methods of determining any one device in an embodiment in which the secondary trigger recognition is performed on any one of the plurality of devices 100 to 500. The any one device may be a device performing a secondary trigger recognition. For convenience, the device performing the secondary trigger recognition may be described as a preferred device or a target device.

An operation relative to an embodiment of performing the primary trigger recognition in the plurality of devices 100 to 500 will be described.

In one example, the primary trigger recognition may be performed in a plurality of devices 100 to 500, and the primary trigger recognition result information may be stored in each of the plurality of devices 100 to 500.

According to an embodiment, the primary trigger recognition result and the feature information stored in each of the plurality of devices 100 to 500 may be mutually shared, and the target device may be determined using the same algorithm in each of the plurality of devices 100 to 500. The plurality of devices 100 to 500 may determine the target device based on at least one of the primary trigger recognition result information or the feature information. If the secondary trigger recognition fails in the target device, whether to perform the voice recognition may be determined based on the primary trigger recognition result information stored in the target device.

According to an embodiment, the operation of determining the target device may be performed by a master device. The master device may determine the target device based on at least one of the primary trigger recognition result information received from the plurality of devices 100 to 500 or the feature information received from the plurality of devices 100 to 500. If the secondary trigger recognition fails in the target device, the master device (or target device) may determine whether to perform the voice recognition based on the primary trigger recognition result information stored in the master device.

According to an implementation, the operation of determining the target device may be performed on an external server. The external server may determine the target device based on at least one of the primary trigger recognition result information or the feature information received from the plurality of devices 100 to 500. If the secondary trigger recognition fails in the target device, the external server (or target device) may determine whether to perform the voice recognition based on the primary trigger recognition result information stored in the external server.

In an example, the primary trigger recognition may be performed in the plurality of devices 100 to 500, and the primary trigger recognition result information may be stored in the master device.

According to one implementation, the operation of selecting the target device may be performed by a master device. The master device may identify (or determine or decide) the target device based on at least one of the primary trigger recognition result information received from the plurality of devices or the feature information received from the plurality of devices 100 to 500. If the secondary trigger recognition fails in the target device, the master device (or target device) may identify whether to perform the voice recognition based on the primary trigger recognition result information stored in the master device.

According to an embodiment, the operation of determining the target device may be performed by an external server. The external server may determine the target device based on at least one of the primary trigger recognition result information or the feature information. If the secondary trigger recognition fails in the target device, the master device (or target device) may determine whether to perform the voice recognition based on the primary trigger recognition result information stored in the master device. When the secondary trigger recognition fails in the target device, the external server (or target device) may determine whether to perform the voice recognition based on the primary trigger recognition result information stored in the external server.

In another example, a primary trigger recognition may be performed in the plurality of devices 100 to 500, and the plurality of devices 100 to 500 may transmit the primary trigger recognition result information to the external server, and the external server may store the primary trigger recognition result information. The external server may identify the target device based on at least one of the primary trigger recognition result information or the feature information. If the secondary trigger recognition fails in the target device, the external server (or target device) may determine whether to perform the voice recognition based on the primary trigger recognition result information stored in the external server.

In an example, primary trigger recognition may be performed on the master device, and the primary trigger recognition result information may be stored in the master device. The operation of determining the target device may be performed by the master device. The master device may identify the target device based on at least one of the primary trigger recognition result information or the feature information stored in the master device. If the secondary trigger recognition fails in the target device, the master device (or target device) may determine whether to perform the voice recognition based on the primary trigger recognition result information stored in the master device.

In another example, a primary trigger recognition may be performed on a master device and an external server may store primary trigger recognition result information. The operation of determining the target device may be performed on the external server. The master device may transmit at least one of a primary trigger recognition result information or feature information of the target device to an external server. The external server may identify the target device based on at least one of the primary trigger recognition result information received from the master device or the feature information received from the master device. If the secondary trigger recognition fails in the target device, the master device (or target device) may determine whether to perform the voice recognition based on the primary trigger recognition result information stored in the master device. When the secondary trigger recognition fails in the target device, the external server (or target device) may determine whether to perform the voice recognition based on the primary trigger recognition result information stored in the external server.

In another example, a primary trigger recognition may be performed on an external server, and the primary trigger recognition result information may be stored in an external server. The external server may identify the target device based on at least one of the primary trigger recognition result information received from the plurality of devices 100 to 500 or the feature information received from the plurality of devices 100 to 500. If the secondary trigger recognition fails in the target device, the external server (or target device) may identify whether to perform the voice recognition based on the primary trigger recognition result information stored in the external server.

In an embodiment of performing voice recognition using the secondary trigger recognition result information of another device, the primary recognition result may be substituted with the secondary recognition result.

If the secondary trigger recognition fails in the target device, various operations may be performed.

According to one embodiment, after a secondary trigger recognition fails, a plurality of devices 100 to 500 may determine whether to perform voice recognition using information received from other devices 100 to 500. The information received from other devices 100 to 500 may refer to primary trigger recognition result information corresponding to user voice received in a plurality of devices 100 to 500. The primary trigger recognition result information may be received from a plurality of devices 100 to 500 or received from the master device.

According to an embodiment, after a secondary trigger recognition fails, the master device (or external server) may determine whether to perform voice recognition using at least one of the stored primary trigger recognition result information or the secondary trigger recognition result information. When the primary trigger recognition result information or the secondary trigger recognition result information is stored in the master device or the external server, whether to perform voice recognition may be determined by using the stored information without receiving additional information from the plurality of devices 100 to 500.

According to an embodiment, before a secondary trigger recognition fails, a target device (or a master device or an external server) may determine whether voice recognition is performed. Specifically, before performing the secondary trigger recognition on the target device, the target device (or the master device or the external server) may determine whether to perform the voice recognition using at least one of the previously stored (or received) primary trigger recognition result information or the secondary trigger recognition result information. If determining to perform voice recognition in the previous step, a separate secondary trigger recognition may not be performed on the target device. When the voice recognition is performed regardless of the secondary trigger recognition result information, a separate secondary trigger recognition may not be required.

A device for performing a secondary trigger recognition may be identified based on the primary trigger recognition result information. When determining that a secondary trigger recognition is to be performed on a specific device, both primary trigger recognition and secondary trigger recognition may be performed in the specific device. However, according to an embodiment, the primary trigger recognition and the secondary trigger recognition may be implemented in a separate device.

According to one embodiment, the primary trigger recognition and the secondary trigger recognition may be performed on the same device. Because the primary trigger recognition requiring only limited processing, computation, and memory resources, the primary trigger recognition may be performed in a low performance mode (or low power mode), and the secondary trigger recognition may be performed in a high performance mode (or a high power mode). According to an embodiment, the secondary trigger recognition may be performed in a general operation mode other than a high performance mode.

According to an embodiment, the primary trigger recognition may be performed on a first device and a secondary trigger recognition may be performed on a second device, and the first device and the second device may exist near the location where the user utters the user voice input. In one example, the primary trigger recognition may be performed on a remote control device, and the secondary trigger recognition may be performed on an electronic apparatus (e.g., a TV) that is controlled by a remote control device. A device for performing a primary trigger recognition (e.g., a remote control device) and a device performing a secondary trigger recognition (e.g., a TV) may be present near the location where the user utters the user voice input. It is assumed the first device is in a low power mode. When the user utters the user voice near the first device, the first device may be converted from a low power mode into a general mode. The first device may obtain a sound pressure of the user voice and may switch from the low power mode to the general mode based on the received sound pressure. The first device operating in the general mode may determine whether the user voice received through the microphone of the first device is similar to the trigger information (e.g., "hi bixby"). The operation of identifying whether the user voice corresponds to the trigger information in the first device may be a primary trigger recognition. If the user voice and trigger information are identified as similar as a result of the primary trigger recognition performed on the first device, the first device may identify that the primary trigger recognition has been successfully input. If the primary trigger recognition succeeds (or fails), the first device may transmit information corresponding to the user voice to the second device. The information corresponding to the user voice may include at least one of audio data of user voice, feature information of user voice, or primary trigger recognition result information (primary trigger recognition success or failure). The second device may perform a secondary trigger recognition based on information corresponding to the user voice received from the first device.

According to an embodiment, a primary trigger recognition may be performed on a first device and a secondary trigger recognition may be performed on a second device, and the first device may exist near the location where the user utters the user voice, and the second device may not exist near the location where the user utters the user voice. In one example, the primary trigger recognition may be performed on an Internet of Things (IoT) device (e.g., an AI speaker) and the secondary trigger recognition may be performed on an external server.

In the embodiments described above, the primary trigger recognition may be an operation of obtaining and recognizing a trigger word included in a user voice, and the secondary trigger recognition may be an operation to address a problem of the false recognition of the obtained trigger word.

If the primary trigger recognition is successful, the device performing the primary trigger recognition may output information informing that the primary trigger recognition has been successful.

In one example, if the primary trigger recognition is successful, the device performing the primary trigger recognition may provide a user interface (UI) through a display. The UI may include an icon or message indicating that the primary trigger recognition has been successfully received.

In another example, if the primary trigger recognition is successful, the device that performs the primary trigger recognition may control the LED so that the LED emits light. Specifically, the device that performed the primary trigger recognition may provide information indicating that the primary trigger recognition has succeeded through the color of the LED, the number of flickering, flickering cycles, or the like.

In another example, if the primary trigger recognition is successful, the device performing the primary trigger recognition may output the audio data through the speaker. The audio data may be a brief sound or preset audio data.

If the secondary trigger recognition is successful, the device performing the secondary trigger recognition may provide information indicating that the secondary trigger recognition has been successful through the display or the speaker, or may additionally provide information to guide a subsequent utterance (e.g., control command) to the user. If determining that the user voice has included a subsequent utterance, the electronic apparatus 100 may provide at least one of image data corresponding to user voice or audio data corresponding to user voice.

The primary trigger recognition and the secondary trigger recognition may utilize different language models, comparison criteria, or the like, used in the comparison operation. In general, the comparison criteria of the secondary trigger recognition may be stricter than the primary trigger recognition. That the comparison criterion is strict may mean that it may be more difficult for a word included in a user voice to be recognized as a trigger.

All of the electronic apparatus 100, the first external device 200, and the second external device 300 may have the same trigger (wake-up word). When the user utters a voice including a trigger, all the electronic apparatus 100, the first external device 200, and the second external device 300 may respond to the user voice (all the plurality of devices may succeed in the primary trigger recognition). In general, because the user intends to utilize a single device to be controlled, a situation in which the plurality of devices react may degrade the user's convenience. Therefore, in a situation that the same trigger information is included, only one of the plurality of devices may perform voice recognition.

To specify any one of the plurality of devices, the feature information for the user voice may be shared. The feature information may be at least one of a size value of a user voice, an orientation angle value of the user voice, or a distance value between the user voice and the device. The plurality of devices may specify (or determine) one device based on the feature information for the shared user voice. A specific description will be described in detail with reference to FIGS. 7 to 10.

If a device is determined, the determined device may perform a secondary trigger recognition operation. After the secondary trigger recognition operation is performed, the determined device may obtain result information corresponding to the secondary trigger recognition operation. If the secondary trigger recognition is successful, the determined device may perform voice recognition on the user voice. However, if the secondary trigger recognition fails, the determined device may not perform voice recognition on the user voice. When the device unsuccessfully recognizes the trigger via the secondary trigger recognition and voice recognition is not performed, voice recognition may not be performed in any of the plurality of devices.

According to the secondary trigger recognition result information of the determined device, a non-response state may occur even though the user's voice has been uttered. As for the non-response state, the user may think that the device has a malfunction, and the operation of performing the voice recognition through the auxiliary analysis may be required in addition to the secondary trigger recognition result of the determined device. A specific operation for this will be described in FIG. 2.

Figure 2:
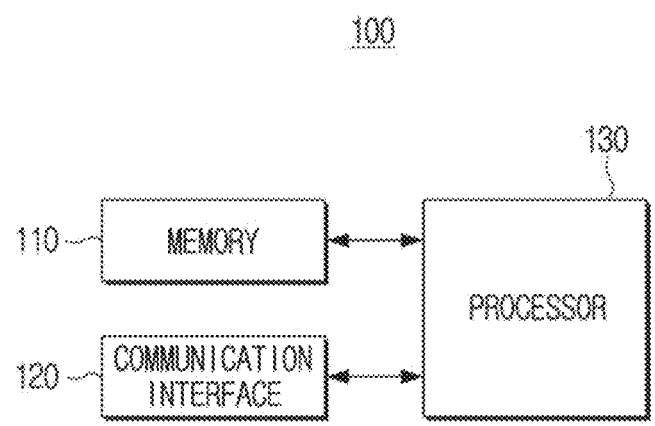
FIG. 2 is a block diagram illustrating an electronic apparatus according to an embodiment.

FIG. 2 is a block diagram illustrating an electronic apparatus according to an embodiment.

Referring to FIG. 2, the electronic apparatus 100 may be composed of a memory 110, a communication interface 120 and a processor 130.

The electronic apparatus according to various embodiments may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, or a wearable device. In some embodiments, the electronic apparatus may include, for example, at least one of a television, a digital video disc (DVD) player, an audio, a refrigerator, an air conditioner, a cleaner, an oven, an electronic range, a washing machine, an air cleaner, a set-top box, a home automation control panel, a security control panel, or a media box.

The electronic apparatus 100 may be implemented as a device that does not include a display, and may transmit an image signal to a separate display device. However, this is only one embodiment, and according to an embodiment, the electronic apparatus 100 may include a display.

The memory 110 may be implemented as an internal memory such as a read-only memory (ROM) included in the processor 130 (for example, electrically erasable programmable read-only memory (EEPROM)), random access memory (RAM), or may be implemented as a memory separate from and external to the electronic apparatus 100.

The communication interface 120 perform communication with various types of external devices according to various types of communication methods. The communication interface 120 may include a Wi-Fi module, a Bluetooth module, an infrared ray communication module, a wireless communication module, or the like. Each communication module may be implemented as at least one hardware chip.

The electronic apparatus 100 may communicate with various external devices via the communication interface 120. Here, the external device may include an electronic apparatus such as a TV, an image processing device such as a set-top box, an external server, a control device such as a remote control, an audio output device such as a Bluetooth speaker, a lighting device, a smart lightbulb, a smart plug, a smart cleaner, a home appliance such as a smart refrigerator, a server such as an Internet of things (IOT) home manager, a smartphone, an artificial intelligence (AI) speaker, or the like.

The Wi-Fi module and the Bluetooth module perform communication by the Wi-Fi method and Bluetooth method, respectively. When using the Wi-Fi module or the Bluetooth module, the various connection information such as the service set identifier (SSID) and the session key may be transceived first, and various information may be transceived after communication connection.

The infrared ray communication module performs communication according to infrared data association (IrDA) technology that transmits data wireless to local area using infrared ray between visible rays and millimeter waves.

The wireless communication module may include at least one chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above.

The communication interface 120 may include at least one of a local area network (LAN) module, Ethernet module, or wired communication module performing communication using a pair cable, a coaxial cable, an optical cable, an ultra-wide band (UWB) module, or the like.

According to an embodiment, the communication interface 120 may use the same communication module (for example, Wi-Fi module) to communicate with an external device such as a remote controller and an external server.

In accordance with another example, the communication interface 120 may utilize different communication modules (for example, Wi-Fi modules) to communicate with an external device such as a remote controller and an external server. For example, the communication interface 120 may use at least one of an Ethernet module or a Wi-Fi module to communicate with an external server, and may use a Bluetooth (BT) module to communicate with an external device such as a remote controller. However, this is merely exemplary, and the communication interface 120 may use at least one communication module among various communication modules when communicating with a plurality of external devices or an external server.

The processor 130 may control overall operations of the electronic apparatus 100. The processor 130 may function to control overall operations of the electronic apparatus 100.

The processor 130 may be implemented as a digital signal processor (DSP), a microprocessor, and a time controller (TCON) for processing a digital image signal.

The processor 130 may control the trigger information to be stored in the memory 110. Here, the trigger may be a wake-up word.

The processor 130 may obtain similarity information by comparing user voice and trigger information (or by performing trigger recognition on user voice). The similarity information may mean information indicating a similarity to the user voice. The similarity information may include similarity values or similarity result information (e.g., similar or non-similar). In addition, the processor 130 may obtain similarity information by comparing text information corresponding to user voice and text information corresponding to trigger information. The similarity information may indicate that a portion of the user voice input is sufficiently similar to the trigger ("hi bixby") or may indicate that no portion of the user voice input is sufficiently similar to the trigger ("hi bixby").

According to an embodiment, similarity information may be different information depending on the voice input received and the method of recognizing the voice input. For convenience of distinction, similarity information may be described as below. The processor 130 may perform the primary trigger recognition and the secondary trigger recognition, and may obtain two similarity information. For convenience of distinction, the similarity information obtained on the basis of the primary trigger recognition performed by the electronic apparatus 100 may be described as the primary similarity information and the similarity information obtained based on the secondary trigger recognition may be described as a second similarity information. In addition to the electronic apparatus 100, the primary trigger recognition and secondary trigger recognition may be performed in the external device 200. Similarity information obtained on the basis of the primary trigger recognition performed on the external device 200 may be described as third similarity information, and the similarity information obtained on the basis of the secondary trigger recognition may be described as fourth similarity information for convenience of distinction.

The processor 130 may receive information corresponding to the user voice from the external device 200 through the communication interface 120, and based on the trigger recognition performed based on the trigger information stored in the memory 110 and the user voice obtained from the electronic apparatus 100 failing (based on the trigger recognition determining that the user voice input does not include the trigger), may perform voice recognition relative to the user voice obtained based on information received from the external device 200, and the information received from the external device 200 may include similarity information (third similarity information) between the user voice (or text information corresponding to the user voice) obtained from the external device 200 and the trigger information.

The user voice may be obtained from the electronic apparatus 100 and the external device 200, respectively. For example, when the user utters a user voice, the electronic apparatus 100 and the external device 200 may obtain user voice through the microphone included in each device. According to an example, the electronic apparatus 100 may obtain user voice through a remote controller. The remote controller may receive the user voice through a microphone of the remote controller and may transmit the received user voice to the electronic apparatus 100. The electronic apparatus 100 may receive the user voice from the remote controller.

The processor 130 may perform trigger recognition (primary trigger recognition) based on received user voice or receive performance result information for the primary trigger recognition from an external device (a remote controller in communication or paired with the electronic apparatus 100). The primary trigger recognition may be a pre-trigger recognition performed before performing the secondary trigger recognition, and a detailed description is described above in FIG. 1. As a result of the trigger recognition, the processor 130 may obtain similarity information. The similarity information may indicate a level of similarity between the user voice and trigger information.

For example, if the user voice is "hi bixbee" and the trigger information is "hi bixby," the similarity information may be 90%. The criterion for determining that the primary trigger recognition is successful in the electronic apparatus 100 may be that the similarity value included in the similarity information is a threshold (e.g., 80%). If the primary similarity information (e.g., 90%) obtained by the primary trigger recognition is equal to or greater than a threshold (e.g., 80%), the processor 130 may determine that the user voice is successful in (or passes) the primary trigger recognition.

If determining that the primary trigger recognition has been successful, the processor 130 may determine whether the primary trigger recognition has been successful in another device (external device 200) other than the electronic apparatus 100 in a network in which the electronic apparatus 100 is included. As described in FIG. 1, a plurality of devices may be included in one network and trigger information may be identical. Accordingly, the processor 130 may determine whether voice recognition is to be performed solely on the electronic apparatus 100 or whether there is a possibility of voice recognition to be performed in a plurality of devices. In order to identify whether there is a possibility of speech recognition to be performed on a plurality of devices, the plurality of devices may share the result information about the primary trigger recognition with each other. The electronic apparatus 100 may transmit the result information of the primary trigger recognition performed on the electronic apparatus 100 to the external device 200 and may receive result information of the primary trigger recognition performed on the external device 200 from the external device 200.

In devices other than the electronic apparatus 100 in the network including the electronic apparatus 100, the processor 130 may perform the secondary trigger recognition if the primary trigger recognition is unsuccessful or other devices other than the electronic apparatus 100 are not determined. When the secondary trigger recognition is passed, the processor 130 may perform voice recognition on the user voice.

If the first trigger recognition is identified as successful in another device other than the electronic apparatus 100 in the network including the electronic apparatus 100, the processor 130 may determine whether the secondary trigger recognition is performed on any of the electronic apparatus 100 and the other device based on the feature information.

The processor 130 may perform trigger recognition based on the first feature information of the user voice obtained by the electronic apparatus 100 and the second feature information of the user voice obtained in the external device 200, and if the trigger recognition fails, the processor 130 may perform voice recognition on the user voice obtained in the electronic apparatus 100 based on information corresponding to the user voice received from the external device 200.

The feature information may include information related to a characteristic of the user voice. For example, the feature information may include at least one of a sound magnitude value, a wavelength, an amplitude, pitch, tone, or a number of vibrations of a user voice. According to an embodiment, the feature information may include at least one of an average sound size value, an average wavelength, an average amplitude, or an average number of vibration of a user voice.

The feature information may include information related to the user voice and the device in which the user voice is received. For example, the feature information may include at least one of a direction angle value of a user voice for a device in which user voice is received or a distance value between a device in which user voice is received or a user voice.

The first feature information received by the processor 130 may be implemented in a form that is obtained from the electronic apparatus 100, or may be implemented in a form obtained from a remote controller paired with the electronic apparatus 100.

The first feature information may mean feature information obtained from the electronic apparatus 100, and the second feature information may mean feature information obtained from the external device 200. The processor 130 may share the obtained first feature information with other devices. Here, the other device may refer to a device included in a network in which the electronic apparatus 100 is included. When the electronic apparatus 100 and the external device 200 are included in the network, the electronic apparatus 100 may transmit the first feature information to the external device 200.

The external device 200 may receive user voice through a microphone included in an external device, and the external device 200 may obtain second feature information based on the received user voice. The external device 200 may transmit the obtained second feature information to the electronic apparatus 100.

The processor 130 may compare the first feature information and the second feature information. A specific comparison operation will be described in FIGS. 7 to 9. The processor 130 may identify whether to perform the secondary trigger recognition based on the comparison result between the first feature information and the second feature information.

It may be identified that the secondary trigger recognition is to be performed in the electronic apparatus 100 among the electronic apparatus 100 and other devices (external device 200).

The processor 130 may perform first trigger recognition based on the user voice and the trigger information and obtain the first similarity information between the user voice and trigger information obtained from the electronic apparatus 100 using the first language recognition model as a primary trigger recognition result. Based on the comparison results and the first similarity information between the first feature information and the second feature information, the processor 130 may identify whether to perform the secondary trigger recognition. Based on performing the secondary trigger recognition, using a second language recognition model, the processor 130 may obtain the second similarity information between the user voice and trigger information obtained from the electronic apparatus 100 as a secondary trigger recognition result and based on the obtained second similarity information being less than threshold. The processor 130 may determine the secondary trigger recognition as failed, and based on the secondary trigger recognition being failed, perform voice recognition for the user voice based on the third similarity information received from the external device 200.

The processor 130 may perform a secondary trigger recognition for user voice, and the processor 130 may obtain second similarity information as result information for the secondary trigger recognition. The second similarity information may include a similarity value.

If the similarity value included in the second similarity information is equal to or greater than a threshold value, the processor 130 may determine that the secondary trigger recognition is successful. If the secondary trigger recognition is successful, the processor 130 may perform voice recognition on user voice.

If the similarity value included in the second similarity information is below a threshold, the processor 130 may determine that the secondary trigger recognition fails. When the secondary trigger recognition fails, the processor 130 may identify whether to perform voice recognition for the user voice based on the third similarity information received from the external device 200. A specific operation will be described in FIGS. 13-18.

The processor 130 may obtain the first similarity information between the user voice and trigger information using the first language recognition model, based on the comparison result and the first similarity information between the first feature information and the second feature information, using the second language recognition model to identify whether to obtain the second use information between the user voice and the trigger information, using a second language recognition model to obtain the second similarity information between the user voice and the trigger information received through the microphone 140, and based on the obtained second similarity information being less than threshold, perform voice recognition for the user voice based on the third similarity information received from the external device 200.

The processor 130 may perform a primary trigger recognition for a user voice, and the primary trigger recognition performed by the electronic apparatus 100 may be performed using a first language recognition model. The first language recognition model may mean a model for converting audio data into text data. The first language recognition model may be a model for converting audio data into text data based on at least one of a waveform, a wavelength, the number of vibrations, and an amplitude of the audio data. The primary trigger recognition performed on the external device 200 other than the electronic apparatus 100 may be performed using the language recognition model that is the same as the first language recognition model. According to an embodiment, the primary trigger recognition performed on the external device 200 may be performed using a language recognition model different from the first language recognition model. Being different from the first language recognition model may mean that at least one of a determination algorithm or a database used to obtain similarity information between user voice and trigger information is different.

The processor 130 may identify whether to obtain second similarity information in the electronic apparatus 100 based on the first similarity information that is the result information for the primary trigger recognition. Here, obtaining the second similarity information may mean performing a secondary trigger recognition. The processor 130 may identify whether to perform the secondary trigger recognition in the electronic apparatus 100 based on the first similarity information.

If the similarity value included in the first similarity information is equal to or greater than a threshold, the processor 130 may determine that the user voice input has been successful with the primary trigger recognition and may identify that the secondary trigger recognition may be performed. However, if the similarity value included in the first similarity information is less than the threshold, the processor 130 may determine that the user voice has failed the primary trigger recognition and may determine that the secondary trigger recognition may not be performed.

The processor 130 may identify whether to perform the secondary trigger recognition based on the feature information even if the primary trigger recognition has been successful. The processor 130 may compare the first feature information corresponding to the user voice received directly from the electronic apparatus 100 and the second feature information for the user voice received from the external device 200. The first feature information may be at least one of a size value of the user voice obtained in the electronic apparatus, an orientation angle value of the user voice for the electronic apparatus, or a distance value between the user voice and the electronic apparatus. The second feature information may be at least one of a size value of the user voice obtained in the external device 200, an orientation angle value of the user voice for the external device 200, or a distance value between a point where the user voice is uttered and the external device 200.

The processor 130 may determine whether to perform a secondary trigger recognition on either of the electronic apparatus 100 and the external device 200 as a result of the comparison between the first feature information and the second feature information. Specific criteria for performing a secondary trigger recognition in which device will be described later in FIGS. 7-10.

If determining the electronic apparatus 100 is to perform the secondary trigger recognition (if the electronic apparatus 100 is to obtain the second similarity information), the processor 130 may perform the secondary trigger recognition for the user voice using the second language recognition model. The processor 130 may obtain second similarity information as a result of the secondary trigger recognition.

The first language recognition model and the second language recognition model may be different, and the processor 130 may obtain second similarity information using the second language recognition model based on the comparison result between the first feature information and the second feature information if the first similarity information is greater than the threshold.

That the first similarity information is equal to or greater than the threshold may mean that the first trigger recognition is successful. If the primary trigger recognition fails, the processor 130 may not perform additional operations. If the primary trigger recognition is successful, the processor 130 may perform a secondary trigger recognition.

The first language recognition model and the second language recognition model may be a model of which at least one of a determination algorithm or a database used to obtain similarity information between user voice and trigger information is different.

If the similarity value included in the obtained second similarity information is less than a threshold value, the processor 130 may identify whether to perform voice recognition on the user voice based on the third similarity information received from the external device 200. Here, the third similarity information may refer to the result information of the primary trigger recognition performed on the external device 200.

The third similarity information may include a similarity value between user voice and trigger information obtained by the external device 200, and the processor 130 may perform voice recognition on the user voice based on whether the similarity value included in the third similarity information is greater than or equal to the threshold.

Each similarity information (the first similarity information, the second similarity information, and the third similarity information) may include result information of whether the similarity value included in each similarity information is greater than or equal to a threshold corresponding to the trigger recognition. The threshold may be different depending on the primary trigger recognition or the secondary trigger recognition. The threshold may be different depending on whether the device is the electronic apparatus 100 or the external device 200. The threshold may be different according to the language recognition model or the determination device in which the trigger recognition is performed.

The processor 130 may perform voice recognition on the user voice based on the result information received from the external device if the similarity value included in the second similarity information is less than the threshold value.

That the similarity value included in the second similarity information is less than the threshold value may mean that, in the electronic apparatus 100, the user voice has failed the secondary trigger recognition. When the electronic apparatus 100 fails the secondary trigger recognition, the processor 130 may identify whether to perform voice recognition for the user voice based on the result information (third similarity information) received from the external device 200.

According to one embodiment, the similarity information may include a similarity value between user voice and trigger information, and the processor 130 may perform voice recognition on the user voice based on the similarity value received from the external device 200 (the similarity value included in the third similarity information) if the similarity value included in the second similarity information is less than the threshold.

The processor 130 may determine whether to perform voice recognition on the user voice based on the result information (or third similarity information) corresponding to the primary trigger recognition of the external device 200 even if the user voice has failed the secondary trigger recognition of the electronic apparatus 100. The result information (or third similarity information) corresponding to the primary trigger recognition of the external device 200 may include at least one of a similarity value for the primary trigger recognition performed on the external device 200 or the success information of the primary trigger recognition performed on the external device 200.

With regard to the similarity value, if the similarity value included in the third similarity information is equal to or greater than the threshold value, the processor 130 may perform voice recognition on the user voice in the electronic apparatus 100. Although the electronic apparatus 100 has failed the secondary trigger recognition on the user voice, the similarity value included in the third similarity information obtained from the external device 200 is high, so that voice recognition for the user voice may be performed. The threshold may be a threshold stored in the electronic apparatus 100, or according to an embodiment, the threshold may be a value stored in the external device 200, not in the electronic apparatus 100.

The first similarity information may include a first similarity value, the second similarity information may include a second similarity value, and the third similarity information may include a third similarity value, and the processor 130 may normalize the first similarity value and the third similarity value received from the external device 200. If the second similarity value is less than the threshold, the processor 130 may identify that the second trigger recognition fails, and if the second trigger recognition fails, the processor 130 may perform the voice recognition for the user voice if at least one of the normalized first similarity value or the normalized third similarity value is greater than or equal to the threshold.

The processor 130 may perform a normalization operation in consideration of both of the first trigger recognition result performed in the electronic apparatus 100 and the first trigger recognition result performed in the external device 200. According to an embodiment, when an external devices is present in addition to the electronic apparatus 100, the processor 130 may normalize the similarity value considering all the primary trigger recognition results performed by the electronic apparatus 100 and the plurality of external devices, respectively.

Because the electronic apparatus 100 and the external device 200 utilize different language recognition models, the range of the similarity value that is the result of the primary trigger recognition may be different. By integrating all the results for the primary trigger recognition, normalization operation may be performed. For example, if a normalization operation is performed, all similarity values may be normalized to a value between 0 and 1. When the normalization operation is performed, the processor 130 may compare a plurality of similarity values according to the same criteria.

The normalized similarity value may refer to "a value in which similarity value included in the third similarity information is normalized."

According to the implementation example, the normalized similarity value may mean a value in which the similarity value included in the first similarity information is normalized. In this example, the processor 130 may use the similarity value received in the external device 200 only in the normalization operation. If the similarity value obtained in the electronic apparatus 100 (the similarity value included in the first similarity information) is equal to or greater than the threshold, the voice recognition of the user voice may be performed.

If the second similarity value is less than the threshold and the third similarity value received from the external device 200 (the similarity value included in the third similarity information) is greater than or equal to the threshold of the first similarity value obtained in the electronic apparatus (the similarity value included in the first similarity information), the processor 130 may generate a control signal to perform voice recognition on the user voice in the external device 200 and may transmit the generated control signal to the external device 200.

The processor 130 may compare the similarity values obtained from the electronic apparatus 100 and the external device 200, respectively. If the first similarity value obtained in the electronic apparatus 100 is greater than the third similarity value obtained by the external device 200, the processor 130 may determine to perform voice recognition on the user voice in the electronic apparatus 100. However, if the third similarity value obtained from the external device 200 is greater than the first similarity value obtained by the electronic apparatus 100, the processor 130 may determine to perform voice recognition on the user voice in the external device 200. However, when the third similarity value obtained from the external device 200 is greater than the first similarity value obtained by the electronic apparatus 100, the processor 130 may determine to perform voice recognition on the user voice in the external device 200 for stability of determination.

The electronic apparatus may further include a display, and the processor 130 may control the display to display a UI including information indicating that the voice recognition is performed on the external device 200 when the control signal is generated. A specific description thereof will be described in detail in FIG. 19.

It is described that the feature information obtained in the electronic apparatus 100 and the feature information obtained in the external device 200 are compared to determine whether the secondary trigger recognition is to be performed in any of the plurality of devices after the first trigger recognition. However, according to an embodiment, the processor 130 may identify the device to perform the secondary trigger recognition using user history information related to trigger recognition. The user history information may include at least one of user's utterance pattern information or a user's past history information. For example, the user history information may include information indicating which device from among the plurality of devices is to be identified as a controlled device when the user voice has been received. For example, the user history information may include all of data for user voice and feature information obtained in a plurality of devices (e.g., table 710, table 810 and table 910).

If the user voice is received and stored as data, the user history information may include a plurality of data. Accordingly, the processor 130 may identify which device among a plurality of devices to perform a secondary trigger recognition based on the plurality of data included in the history information.

The user history information may also include data information different for each of a plurality of users, and the processor 130 may identify the user and identify whether to perform a secondary trigger recognition on any of the plurality of devices based on data corresponding to the identified user.

In the process of determining a device to perform a secondary trigger recognition using user history information, the processor 130 may utilize an artificial intelligence model. The artificial intelligence model may receive user voice or feature information corresponding to user voice (feature information obtained in a plurality of devices) as input data, and may output a device to perform secondary trigger recognition of the plurality of devices as output data.

The processor 130 may communicate with various external devices using the communication interface 120. Here, the external device may include a display device such as a TV, an image processing device such as a set-top box, an external server, a control device such as a remote control, an audio output device such as a Bluetooth speaker, a lighting device, a smart lightbulb, a smart plug, a smart cleaner, a home appliance such as a smart refrigerator, a server such as an Internet of things (IOT) home manager, a smartphone, a server such as an artificial intelligence (AI) speaker, or the like.

The electronic apparatus 100 according to an embodiment may apply a speech to text (STT) function directly to a digital voice signal to convert to text information and may transmit the converted text information to the external server.

According to another embodiment, the electronic apparatus 100 may transmit a received digital voice signal to a voice recognition server. The voice recognition server may convert a digital voice signal to text information using the STT. The voice recognition server may transmit the text information to another server or the electronic apparatus 100 to perform a search corresponding to the text information, and in some cases, the voice recognition server may perform a search directly.

In relation to the operation of the electronic apparatus 100, a primary trigger recognition, a secondary trigger recognition, and a voice recognition for a control command may require a text conversion operation for a user voice. At least one of the primary trigger recognition, the secondary trigger recognition, and the voice recognition for the control command may be performed on the electronic apparatus 100 and may be performed on the external server according to the implementation example.

For example, the secondary trigger recognition may be performed on an external server other than the electronic apparatus 100. The processor 130 may transmit the user voice to an external server for secondary trigger recognition, and the external server may perform a secondary trigger recognition on user voice received from the electronic apparatus 100. The external server may obtain similarity information as a result information of the secondary trigger recognition, and may transmit the obtained similarity information to the electronic apparatus 100.

The above description describes an embodiment in which the electronic apparatus 100 receives a user voice directly, including the microphone 140. However, according to another implementation, a plurality of devices may receive user voice from an external control device. The external control device may include a microphone. The external control device may receive user voice to convert to digital data and may transmit the converted digital data to a plurality of devices. The plurality of devices may perform a trigger recognition operation based on the received digital data (digital data corresponding to user voice). However, in the corresponding embodiment, it is difficult to identify which device among a plurality of devices is targeted. To solve this problem, an operation identifying the location of the external control device may be performed. The plurality of devices may identify the location of the external control device and may share the identified location information. It may be identified that the secondary trigger recognition is to be performed on the device closest to the external control device.

According to an embodiment, the electronic apparatus 100 may receive user voice from an external control device having a microphone. For example, the external control device may be implemented as a remote control device (remote controller) including a microphone, but the external control device is not limited thereto. Here, when a remote control device (remote controller) receives an analog voice signal of a user through a microphone, the remote control device (remote controller) may convert the analog voice signal to a digital voice signal. The remote control device (remote controller) may transmit the converted digital voice signal to the electronic apparatus 100 using at least one of an infrared, a Wi-Fi or a Bluetooth communication method. When the digital voice signal is received from the external control device, the electronic apparatus 100 may perform voice recognition based on the received digital voice signal and may perform a control operation based on the voice recognition result information. According to an embodiment, the remote control device (remote control) may perform a voice recognition operation on the digital voice signal and transmit information corresponding to the voice recognition result information to the electronic apparatus 100. The information corresponding to the voice recognition result information may be at least one of a voice recognition result itself or a control command corresponding to the voice recognition result information.

According to an embodiment, the external control device may be implemented with a smartphone including a microphone. In this example, a smartphone may remotely control the electronic apparatus 100 using a remote control application performing a pre-installed remote control function of the device.

The smartphone may convert the analog voice signal to a digital voice signal when the user's analog voice signal is received through the microphone. In this example, the smartphone may perform voice recognition on the digital voice signal by using the voice recognition application. The voice recognition application may be the same as the remote control application described above, or may be a different application. The smartphone may be remotely controlled by using the remote control application based on the voice recognition result information when the voice recognition is performed on the digital voice signal. According to an embodiment, the smartphone may transmit the converted digital voice signal to a smartphone using at least one of an infrared, a Wi-Fi or a Bluetooth communication method. When a digital voice signal is received from an external control device, the smartphone may perform voice recognition based on the received digital voice signal and may perform a control operation based on the voice recognition result information.

An AI model may be used in at least one of the trigger recognition or voice recognition of the disclosure. The electronic apparatus 100 may perform at least one of trigger recognition or voice recognition based on an AI system utilizing a machine learning algorithm.

The electronic apparatus 100 may perform various operations to control the voice recognition even when the secondary trigger recognition fails. Therefore, the electronic apparatus 100 may prevent a non-response state and may raise the success rate of the voice recognition and improve user convenience.

Configurations of the electronic apparatus 100 have been described, but various configurations may be additionally provided, as described below.

Figure 3:
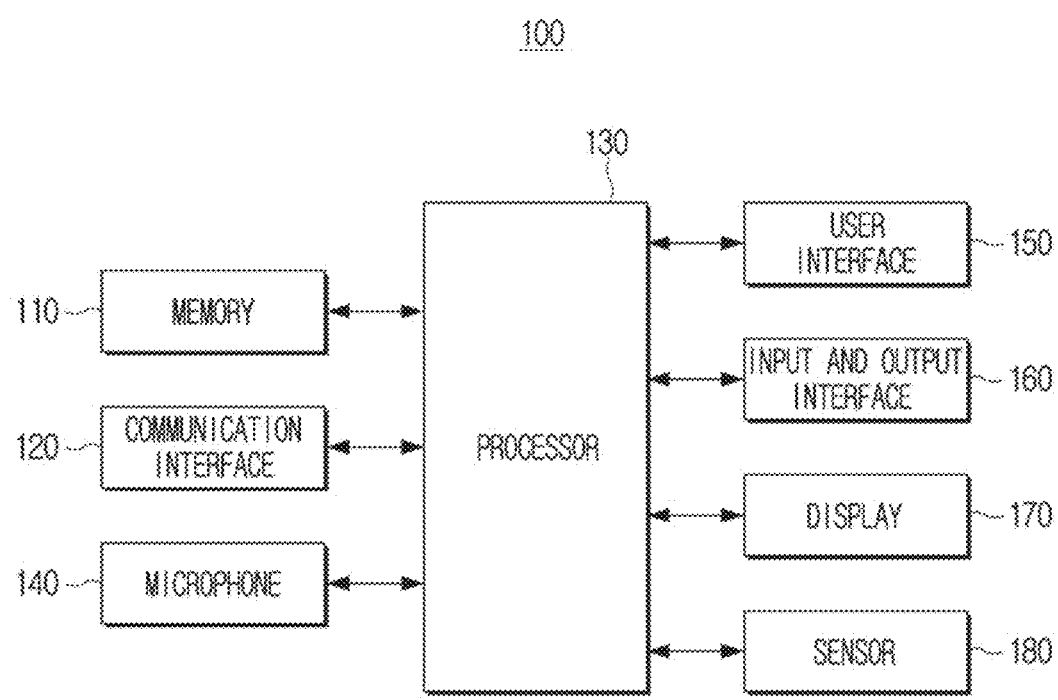
FIG. 3 is a block diagram illustrating a specific configuration of the electronic apparatus of FIG. 1.

FIG. 3 is a block diagram illustrating a detailed configuration of an electronic apparatus of FIG. 1.

Referring to FIG. 3, the electronic apparatus 100 may include a memory 110, a communication interface 120, a processor 130, a microphone 140, a user interface 150, and an input and output interface 160, a display 170, and a sensor 180.

The operations of the memory 110, the communication interface 120, and the processor 130 have been discussed above with respect to FIG. 2.

The processor 130 controls the operation of the electronic apparatus 100 by using various programs stored in the memory 110. Specifically, the processor 130 may include a random access memory (RAM), a read-only memory (ROM), a main central processing unit (CPU), a first to $N^{th}$ interface, and a bus. The RAM, ROM, main CPU, first to $N^{th}$ interface, or the like, may be connected to each other through a bus.

The processor 130 may perform a graphic processing function (video processing function). For example, the processor 130 may generate an image to be displayed on a screen including various objects such as icons, images, text, and the like using image processing.

The processor 130 may perform audio processing for audio data. To be specific, the processor 130 may perform various audio processing such as decoding, scaling, noise filtering, for the audio data.

The electronic apparatus 100 may further include a microphone 140. The microphone is configured to receive user voice or other sound to convert the sound into audio data.

The user interface 150 may be implemented as a button, a touch pad, a mouse, and a keyboard, or may be implemented as a touch screen which may perform the display function and a manipulation input function as well.

The input and output interface 160 may be one of the high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The input and output interface 160 may input and output at least one of an audio signal and a video signal.

According to an example, the input and output interface 160 may include a port to input and output only an audio signal or a port to input and output only a video signal as a separate port, or may be implemented as a port which input and output both the audio signal and the video signal.

The display 170 may be implemented as a display of various types such as a liquid crystal display (LCD), organic light emitting diodes (OLED) display, plasma display panel (PDP), or the like. In the display 170, a backlight unit, a driving circuit which may be implemented as an a-si TFT, low temperature poly silicon (LTPS) TFT, organic TFT (OTFT), or the like, may be included as well. In the meantime, the display 110 may be implemented as a touch screen coupled with a touch sensor, a flexible display, a third-dimensional (3D) display, or the like.

According to an embodiment, the display 170 may include a display panel for outputting an image and a bezel housing a display panel. According to an embodiment, the bezel may include a touch sensor for sensing user interaction.

The sensor 180 may refer to a device capable of detecting a user motion or location.

The sensor 180 may obtain an image using a camera and identify a user's location based on the obtained image.

The camera is configured to capture an object and generate a captured image, which includes both a moving image and a still image. The camera may obtain an image for at least one external device and may be implemented with a camera, a lens, an infrared sensor, or the like.

The camera may include a lens and an image sensor. The lens type includes a general purpose lens, a wide angle lens, a zoom lens, or the like, and may be determined according to the type, features, usage environment, or the like, of the electronic apparatus 100. A complementary metal oxide semiconductor (CMOS) and a charge coupled device (CCD) may be used as the image sensor.

The camera outputs as an image signal corresponding to the light incident thereon. Specifically, the camera may include a lens, a pixel, and an analog-to-digital (AD) converter. The lens may collect the light of the object to form an optical image on a captured region, and the pixel may output the light incident through the lens to an analog-type image signal. The AD converter may convert an analog image signal into a digital image signal and output the converted image signal. The camera may be arranged to capture a front direction of the electronic apparatus 100 and capture a user present on the front surface of the electronic apparatus 100 to generate a captured image.

The electronic apparatus 100 according to an embodiment is described to have a single camera, but a plurality of cameras may be arranged. The electronic apparatus 100 may include a plurality of cameras, and may combine images received through a plurality of cameras to identify a head position of the user. The three-dimensional movement may be more accurately analyzed using a plurality of cameras than one camera, so that the user's head position may be more effectively identified.

The sensor 180 according to another embodiment may be a senor using electromagnetic waves.

The sensor 180 may output electromagnetic waves. The outputted electromagnetic wave or the ultrasound wave may be reflected by an object. The object may refer to an object that reflects electromagnetic waves or ultra-waves, such as a human and a thing, near the sensor 180. The sensor 180 may obtain the data reflected by the object and may identify the location of the user based on the obtained data. For example, the sensor 180 may detect the location of a user using infrared or the like.

The sensor 180 according to an embodiment may be a sensor using ultrasonic waves. For example, the sensor 180 may output ultrasound waves and receive the ultrasound waves reflected by the object to detect the location of the user. The sensor 180 may include a speaker for outputting an ultrasonic wave and a microphone for receiving the reflected ultrasonic wave.

In the embodiments described above, the sensor 180 detected the location of the user, but according to the implementation example, the sensor 180 may identify whether the user has been approached. For example, if a user is located within a threshold distance of the electronic apparatus 100, the sensor 180 may identify that the user has been approached.

Figure 4:
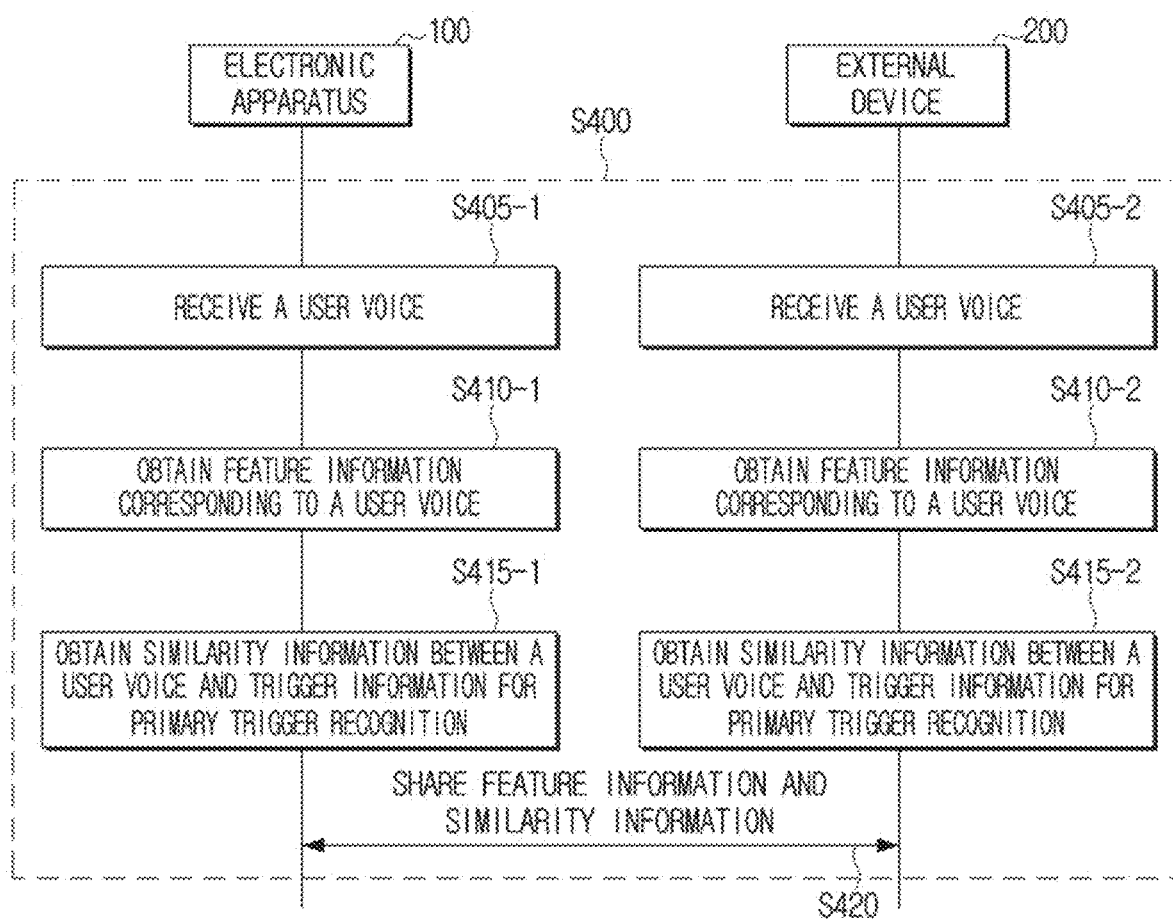
FIG. 4 illustrates a diagram of sharing information between an electronic apparatus and an external device.

FIG. 4 illustrates a diagram of sharing information between an electronic apparatus and an external device.

Referring to FIG. 4, the electronic apparatus 100 and the external device 200 may share information about the user voice in operation S400.

The electronic apparatus 100 may receive the user voice through a microphone included in the electronic apparatus 100 in operation S405-1. The electronic apparatus 100 may obtain feature information corresponding to the user voice in operation S410-1. The feature information may include various information that may be obtained based on user voice. For example, the feature information may include at least one of a size value corresponding to a user voice obtained in the electronic apparatus 100, an orientation angle value (or orientation coefficient) of a user voice relative to the electronic apparatus 100, or a distance value between a point where the user voice is uttered and the electronic apparatus 100. The electronic apparatus 100 may obtain primary similarity information between user voice and trigger information for primary trigger recognition in operation S415-1. The trigger may refer to a wake-up word. The electronic apparatus 100 may identify whether the user voice is similar to the stored trigger information (or wake-up word information) and obtain primary similarity information as a result of the identification. The primary similarity information may be referred to as reliability information.

The external device 200 may perform operations similar to the operations of S405-1 to S415-1. The external device 200 may receive the user voice through a microphone included in the external device 200 in operation S405-2. The external device 200 may obtain feature information corresponding to the user voice in operation S410-2. The external device 200 may obtain primary similarity information between user voice and trigger information for the primary trigger recognition in operation S415-2. The primary similarity information may include at least one of a similarity value or a result information on whether a primary trigger recognition was successful.

The primary trigger recognition may be identified based on the primary similarity information obtained in the operation of S415-1. The primary similarity information may include a similarity value according to the degree of similarity, and the electronic apparatus 100 may determine that the user voice input passes the primary trigger recognition if the similarity value is equal to or greater than the threshold and may determine that the user voice input fails the primary trigger recognition if the similarity value is less than the threshold. The electronic apparatus 100 may store the result information on whether the primary trigger recognition has passed on the memory 110.

The electronic apparatus 100 and the external device 200 both may obtain primary similarity information between user voice and trigger information for the primary trigger recognition and feature information corresponding to the user voice. The electronic apparatus 100 and the external device 200 may share obtained information (feature information and primary similarity information) in operation S420. The electronic apparatus 100 may transmit the obtained feature information and the primary similarity information to the external device 200. The external device 200 may transmit the obtained feature information and the primary similarity information to the electronic apparatus 100.

Referring to FIG. 4, the electronic apparatus 100 and the external device 200 are illustrated as sharing information, but three or more devices may share information and the electronic apparatus 100 may transmit information to all of the devices sharing information.

Figure 5:
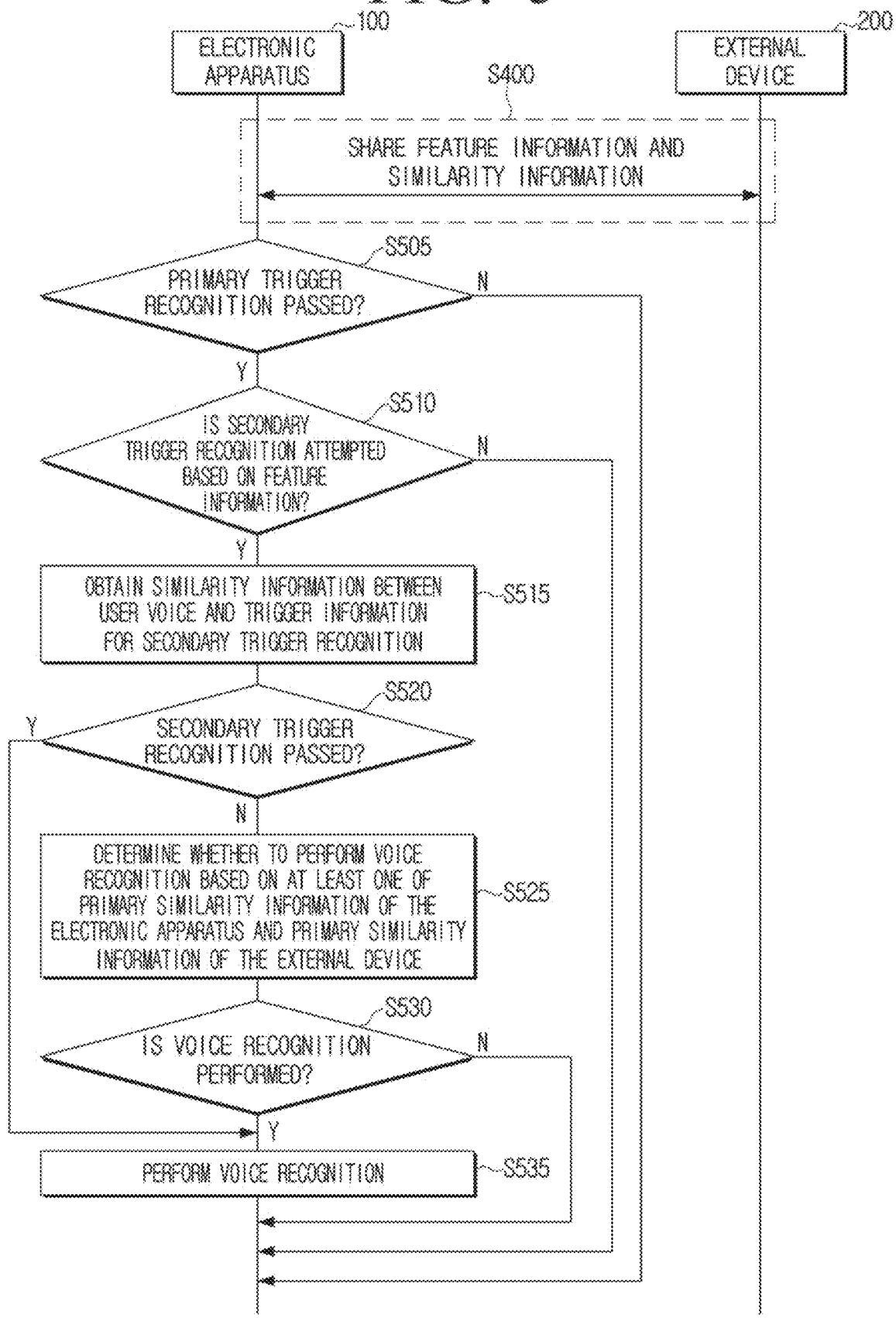
FIG. 5 illustrates a flowchart of an operation of performing a voice recognition after trigger recognition.

FIG. 5 illustrates a flowchart of an operation of performing a voice recognition after trigger recognition.

Referring to FIG. 5, after the information sharing in operation S400 of FIG. 4 is performed, the electronic apparatus 100 may identify whether the primary trigger recognition is successful based on the primary similarity information between user voice and trigger information in operation S505. If it is determined that the primary trigger recognition is unsuccessful, the electronic apparatus 100 may end the operation related to trigger recognition and voice recognition.

If it is determined that the primary trigger recognition is successful, the electronic apparatus 100 may determine whether to attempt the secondary trigger recognition based on the feature information in operation S510. When the electronic apparatus 100 has performed the primary trigger recognition with the user voice obtained by the electronic apparatus 100, the electronic apparatus 100 may identify whether to attempt the secondary trigger recognition based on the feature information obtained by the electronic apparatus 100. The electronic apparatus 100 may identify whether to attempt the secondary trigger recognition by considering the feature information obtained from the electronic apparatus 100 together with the feature information obtained in the external device 200. The electronic apparatus 100 may identify that only one of the plurality of devices performs a secondary trigger recognition. A specific method of determining whether to perform a secondary trigger recognition in any of the plurality of devices will be described in detail with respect to FIGS. 7-9.

If it is determined that the electronic apparatus 100 does not attempt a secondary trigger recognition, the electronic apparatus 100 may no longer proceed and may end the trigger recognition process.

If determining that the electronic apparatus 100 attempts the secondary trigger recognition, the electronic apparatus 100 may obtain secondary similarity information between user voice and trigger information for the secondary trigger recognition in operation S515. For the secondary trigger recognition, a language recognition model different from the primary trigger recognition may be used. Accordingly, the first similarity information and the second similarity information may be different, and the result of the primary trigger recognition and the result of the secondary trigger recognition may be different.

In operation S520, the electronic apparatus 100 may determine whether the secondary trigger recognition is successful. When the secondary trigger recognition is successful, the electronic apparatus 100 may perform voice recognition with respect to the user voice in operation S535.

If the user voice does not pass the secondary trigger recognition, the electronic apparatus 100 may determine whether to perform voice recognition based on at least one of the primary similarity information of the electronic apparatus 100 and the primary similarity information of the external device 200 in operation S525. Even if the secondary trigger recognition is unsuccessful, the voice recognition rate may be increased through supplemental recognition. A specific operation of S525 will be described in detail with respect to FIGS. 13-18.

The electronic apparatus 100 may identify whether to perform voice recognition based on the determination result in operation S530. If determining that the voice recognition is to be performed based on the determination result, the electronic apparatus 100 may perform voice recognition on the user voice in operation S535.

Figure 6:
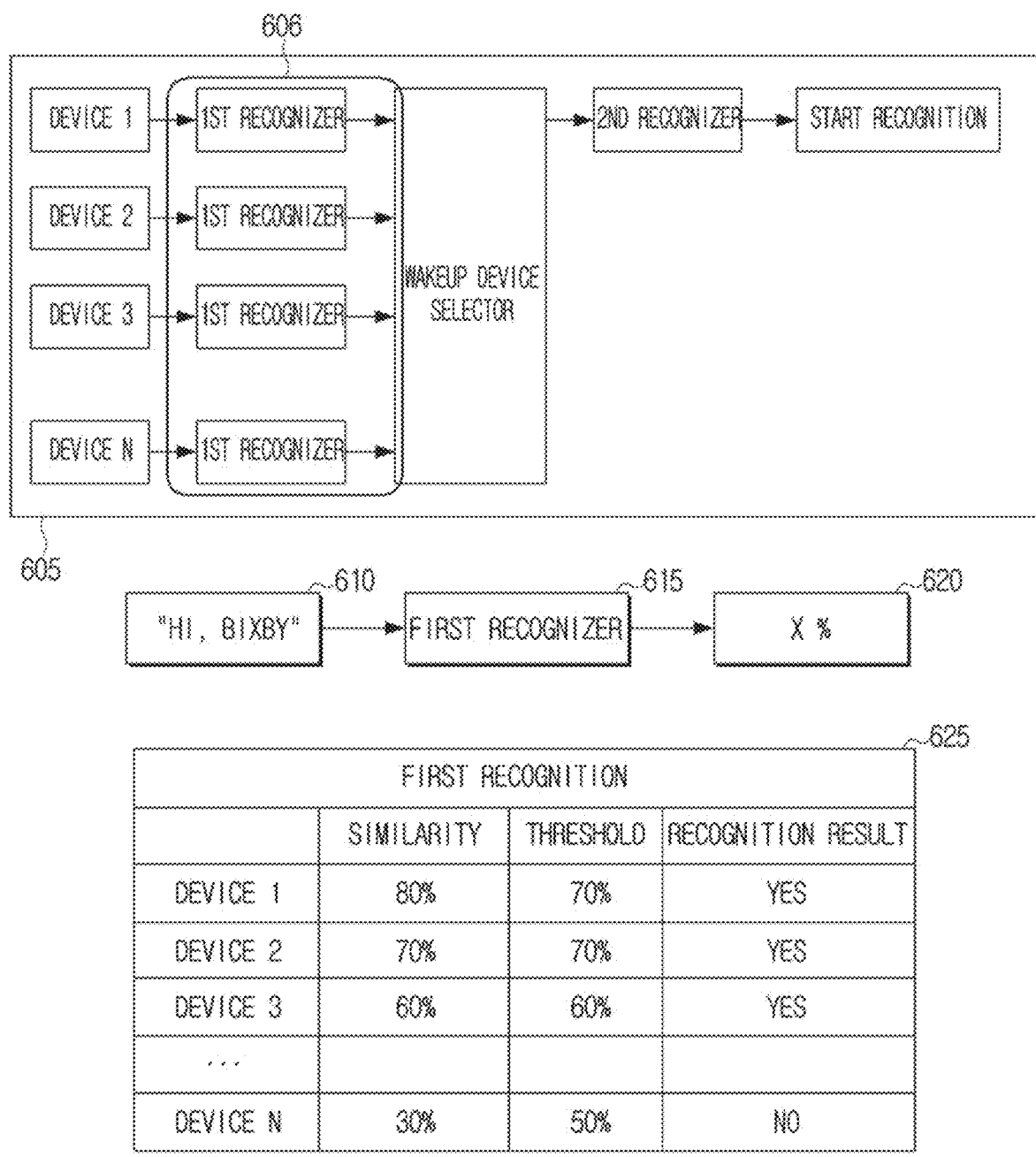
FIG. 6 illustrates a diagram of a primary trigger recognition operation.

FIG. 6 illustrates a diagram of a primary trigger recognition operation.

Referring to FIG. 6, a plurality of devices may be included in one network. For example, a plurality of devices may be connected to a particular Wi-Fi network, and the user may control a plurality of devices based on a specific Wi-Fi network.

A table 605 may include a first trigger recognition, a second trigger recognition, and a voice recognition. Referring to FIG. 6, a primary trigger recognition process 606 is described. The primary trigger recognition process 606 may be performed on at least one device receiving user voice among a plurality of devices included in one network.

The plurality of devices may include a microphone and may receive the user voice through the microphone. A plurality of devices may compare the user voice with trigger information (or wake-up word information) and control commands. The trigger information may refer to a word to activate a device to perform a control operation, and the control command may refer to a command to control the device. For example, assuming that the user voice is "hi bixby, please turn off," "hi bixby" may be the trigger information, and "please turn off" may be a control command.

The trigger information may be "hi, bixby" 610. The plurality of devices receiving the user voice may analyze the user voice using a primary trigger recognizer (first recognizer) 615. The primary trigger recognizer 615 may include a language recognition model for identifying similarity between the received user voice and pre-stored trigger information. The trigger information may be a wake-up word. The language recognition model may refer to a model for converting audio data into text data. The primary trigger recognizer 615 may receive user voice and output similarity information. The similarity information may include a similarity value 620, and the similarity value 620 may be output in a percentage form or any normalized form. For example, the similarity value may be output as x %.

The primary trigger recognizer 615 may refer to a software module that converts user voice into text and outputs similarity information indicating an extent to which the converted text is similar to the pre-stored wake-up word.

According to an embodiment, the plurality of devices may use the same primary trigger recognizer. However, according to an embodiment, the plurality of devices may use different primary trigger recognizers.

The table 625 may include result information of performing primary trigger recognition in a plurality of devices. The similarity value of the first device may be 80%, the similarity value of the second device may be 70%, and the similarity value of the third device may be 60%. Each device may determine whether a primary trigger recognition is successful based on the obtained similarity value and the pre-stored threshold. The threshold of the first device may be 70%, the threshold of the second device may be 70%, and the threshold of the third device may be 60%.

If the obtained similarity value is greater than or equal to the pre-stored threshold, each device may identify that the user voice has passed the primary trigger recognition. For example, with reference to table 625, the primary trigger recognition is successfully completed by the first device, the second device, and the third device. However, the similarity value of the n device (e.g., 30%) is less than the pre-stored threshold (e.g., 50%), n device may identify that the user voice did not satisfy the primary trigger recognition.

The plurality of devices may mutually share result information on the obtained primary trigger recognition.

Figure 7:
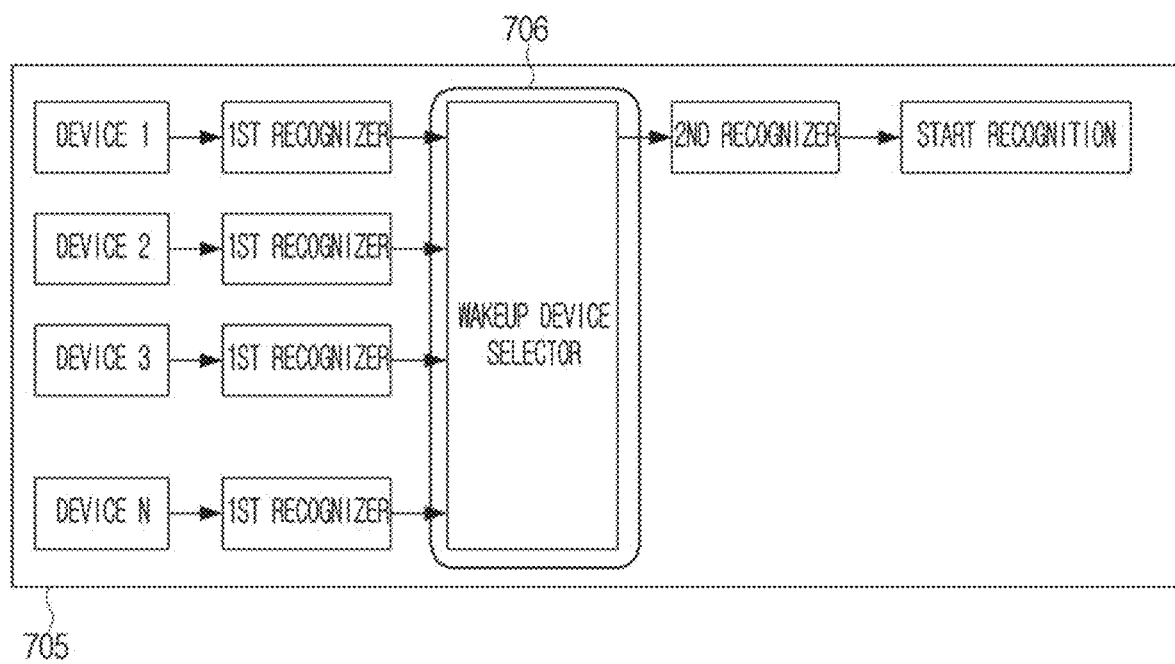
FIG. 7 illustrates a diagram of selecting an apparatus to perform a secondary trigger recognition operation among a plurality of apparatuses.

FIG. 7 illustrates a diagram of selecting an apparatus to perform a secondary trigger recognition operation among a plurality of apparatuses.

Performing the secondary trigger recognition on both devices may be inefficient since the user may intend to control one specific device through voice recognition. Therefore, the plurality of devices according to one embodiment all may perform the primary trigger recognition, but the secondary trigger recognition may be only performed on a specific device.

Referring to FIG. 7, each of the plurality of devices may determine which device to perform the secondary trigger recognition based on the feature information.

A table 705 may include a first trigger recognition, a second trigger recognition, and a voice recognition process. Referring to FIG. 7, a process 706 for determining whether to perform a secondary trigger recognition in any of a plurality of devices is described. The process 706 for determining whether to perform a secondary trigger recognition may be performed in each of a plurality of devices.

Although not shown in FIG. 7, for the process 706 of determining to perform a secondary trigger recognition, a plurality of devices may share mutual feature information. Here, the feature information may refer to analysis information of user voice obtained in each of the plurality of devices. Specifically, the feature information may include at least one of a size value of a user voice obtained in each device, an orientation angle value of each device and a user voice, or a distance between each device and a point where the user voice is uttered.

After the feature information is shared, the plurality of devices may identify which device to perform the secondary trigger recognition based on the shared feature information.

Referring to FIG. 7, the plurality of devices may identify which device to perform the secondary trigger recognition based on the size value of the user voice. The size value of the user voice may refer to an amplitude value or a sound magnitude value of the audio data included in the user voice. The plurality of devices may identify that only a device having the largest size value of the user voice performs the secondary trigger recognition.

Each of the plurality of devices may compare the size value of the user voice with the size value of the shared user voice to identify the largest size value of the user voice. If the size value of the user voice is largest, the device may perform the secondary trigger recognition. If the size value of the user voice is not the largest, the secondary trigger recognition may not be performed.

The table 710 may be comparison result information (or selection result information) identifying which device is to perform the secondary trigger recognition and the feature information shared by the plurality of devices. The first device may obtain a size value of the user voice as a value of 62 dB, and the second device may obtain a size value of the user voice as 60 dB, and the third device may obtain a size value of the user voice as 58 dB. The plurality of devices may identify that the first device having the largest value in the shared feature information (the size value of the user voice) performs the secondary trigger recognition. Therefore, the secondary trigger recognition may be performed only in the first device.

If the size value of the user voice does not pass the primary trigger recognition even though the size value of the user voice is largest, the corresponding device may not perform the secondary trigger recognition. If the trigger information is entirely different and the primary trigger recognition is unsuccessful, there is no need to perform the secondary trigger recognition.

Figure 8:
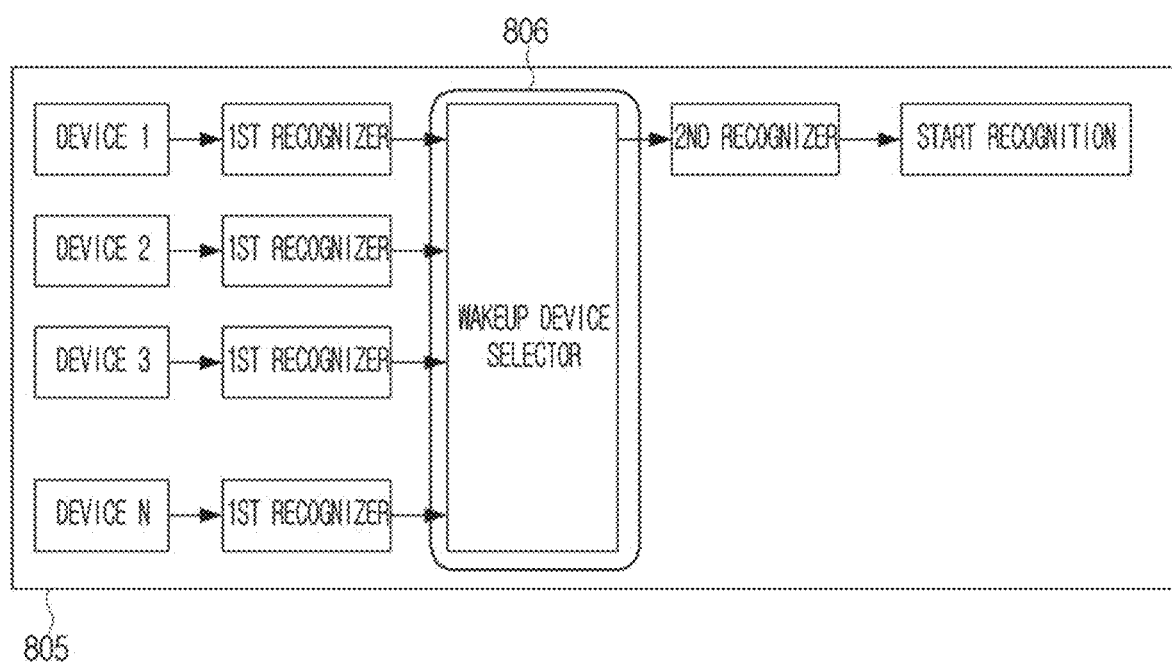
FIG. 8 illustrates a diagram of selecting an apparatus to perform a secondary trigger recognition operation among a plurality of apparatuses.

FIG. 8 illustrates a diagram of selecting an apparatus to perform a secondary trigger recognition operation among a plurality of apparatuses.

Referring to FIG. 8, a table 805 and a process 806 may correspond to the table 705 and the process 706 of FIG. 7, and an redundant descriptions thereof will be omitted.

The plurality of devices may identify which device to perform the secondary trigger recognition based on the orientation angle value of the user voice for the device. Specifically, the plurality of devices may receive a user voice and obtain an orientation angle value corresponding to the user voice. Based on the orientation angle value, the plurality of devices may identify whether the voice uttered by the user has been uttered relative to a direction in the front or side of the user. When the user voice is uttered in the front direction, the plurality of devices may determine the orientation angle value as 90 degrees. Accordingly, the plurality of devices may determine a selected device as the orientation angle value is closer to 90 degrees.

The table 810 illustrates comparison result information (or selection result information) identifying which device is to perform the secondary trigger recognition and the feature information shared by a plurality of devices. The first device may obtain an orientation angle value as 90 degrees, and the second device may obtain an orientation angle value as 80 degrees, and the third device may obtain an orientation angle value as 70 degrees. The plurality of devices may identify that a first device having a value closest to a threshold (e.g., 90 degrees) of the shared feature information (e.g., 90 degrees) performs a secondary trigger recognition. Therefore, the secondary trigger recognition may be performed only in the first device.

If the orientation angle value is closest to the threshold but does not pass the primary trigger recognition, the device may not perform the secondary trigger recognition. If the trigger information is entirely different and does not pass the primary trigger recognition, there is no need to perform the secondary trigger recognition.

Figure 9:
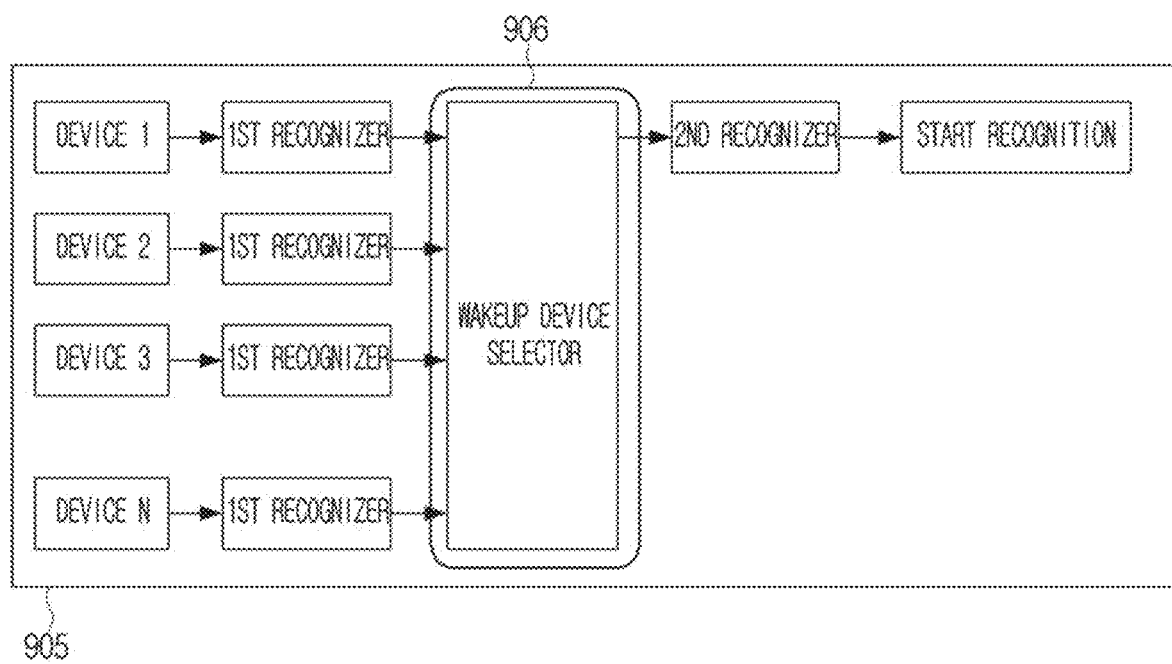
FIG. 9 illustrates a diagram of selecting an apparatus to perform a secondary trigger recognition operation among a plurality of apparatuses.

FIG. 9 illustrates a diagram of selecting an apparatus to perform a secondary trigger recognition operation among a plurality of apparatuses.

Referring to FIG. 9, a table 905 and a process 906 may correspond to the table 705 and the process 706 of FIG. 7 and redundant descriptions thereon will not be described.

The plurality of devices may identify which device to perform the secondary trigger recognition based on the distance value between the device and the point where the user voice is uttered. Specifically, the plurality of devices may receive a user voice and obtain a distance value corresponding to the user voice. Specifically, the plurality of devices may determine that the user speech has been uttered from which distance, and may obtain a distance value between the point where the user voice is uttered and the device as a subject of identification. The plurality of devices may select the device existing at the closest distance from the point at which the user voice is uttered performs the secondary trigger recognition.

A table 910 may be comparison result information (or selection result information) identifying which device is to perform the secondary trigger recognition and the feature information shared by a plurality of devices. The first device may obtain a distance value as 2 m, the second device may obtain a distance value as 4 m, and the third device may obtain a distance value as 5 m. The plurality of devices may identify that the first device having the smallest value among the shared feature information (the distance between the device and the point where the user voice is uttered) performs the secondary trigger recognition. Therefore, the secondary trigger recognition may be performed only in the first device.

Even if the distance value is the smallest, if the primary trigger recognition is unsuccessful, the corresponding device may not perform the secondary trigger recognition. If the trigger information is entirely different and may not pass the primary trigger recognition, there is no need to perform the secondary trigger recognition.

Figure 10:
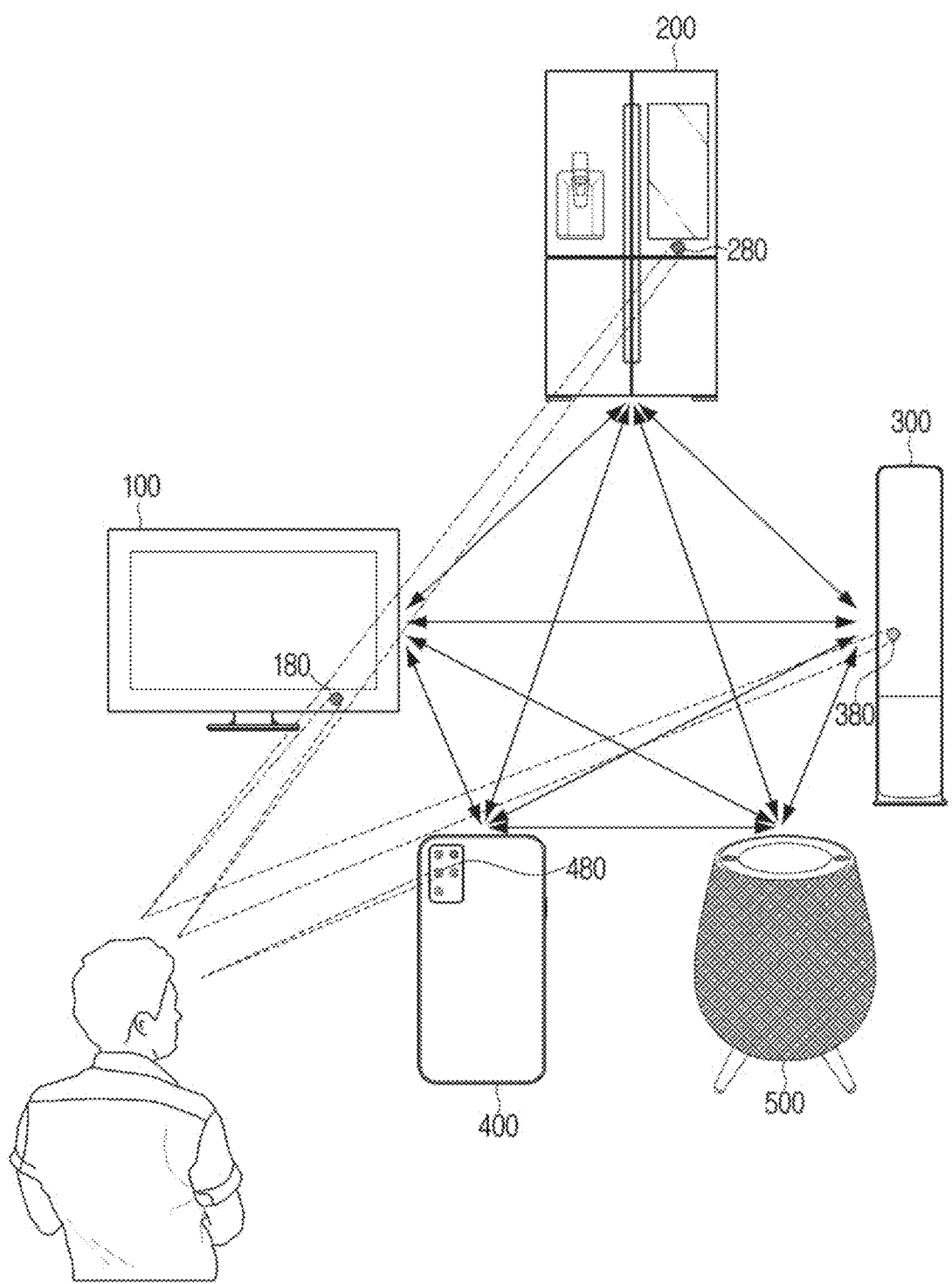
FIG. 10 illustrates a diagram of identifying a location of an utterer by a sensor.

FIG. 10 illustrates a diagram of identifying a location of an utterer by a sensor.

Referring to FIG. 10, some devices 100 to 400 of a plurality of devices 100 to 500 may include image sensors 180, 280, 380, 480. The image sensor may obtain the image data used to perform an operation to identify the user's location. Some of the plurality of devices 100 to 400 may obtain image data by using a camera lens and identify the location of the user based on the obtained image data.

The devices 100 to 400 including sensors 180, 280, 380, 480 may obtain a distance between the location of the user and the location of the device based on the location of the user. The obtained distance value may be included in the feature information mentioned in FIG. 9. Accordingly, each of the sensors 180, 280, 380, 480 included in the devices 100 to 400 may be the same sensor and may be different sensors depending on the implementation.

The device 500 may not include an image sensor. The device 500 may include an audio sensor. The device 500 may obtain the reflected audio data (electromagnetic waves or ultrasonic waves) using an audio sensor, and may identify the location of the user based on the obtained audio data.

Figure 11:
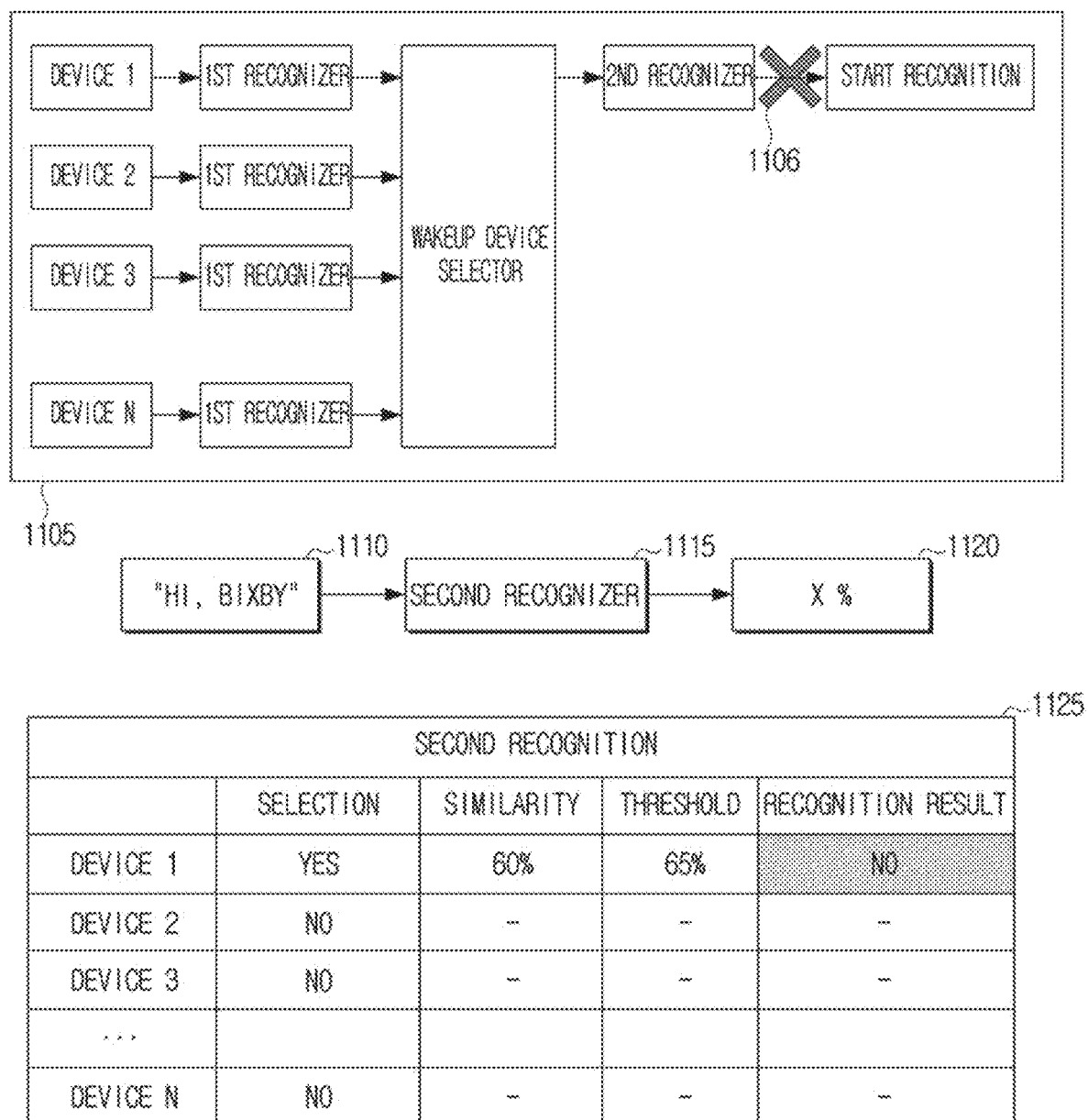
FIG. 11 illustrates a diagram of a secondary trigger recognition operation.

FIG. 11 illustrates a diagram of a secondary trigger recognition operation.

Referring to FIG. 11, a device determined to perform a secondary trigger recognition among a plurality of devices may perform a secondary trigger recognition. It is assumed that the first device is determined to perform the secondary trigger recognition.

A table 1105 may include a first trigger recognition, a second trigger recognition, and a voice recognition. In FIG. 11, a situation 1106 in which a secondary trigger recognition fails is described.

The first device may receive input of "hi, bixby," which is a received user voice, into a secondary trigger recognizer (second recognizer) 1115, and a secondary trigger recognizer 1115 may output similarity information based on the inputted user voice 1110. The similarity information may include a similarity value 1120. The user voice 1110 may be the same data as the user voice 610 of FIG. 6. In addition, the secondary trigger recognizer 1115 may correspond to the primary trigger recognizer 615. The secondary trigger recognizer 1115 may obtain similarity information between trigger information and pre-stored trigger information as well as the primary trigger recognizer 615. However, the secondary trigger recognizer 1115 may have a determination algorithm and a database different from the primary trigger recognizer 615.

A table 1125 may indicate result information for secondary trigger recognition. The first device may obtain the result information by performing a secondary trigger recognition with respect to a user voice. Specifically, the first device may perform a secondary trigger recognition operation and then obtain a similarity value of 60% as result information. It is assumed that the predefined threshold is 65% to pass the secondary trigger recognition. Since the similarity value (60%), which is a result value according to the secondary trigger recognition, is less than the predetermined threshold (65%), the secondary trigger recognition may be unsuccessful.

In the context of FIG. 11, any of the plurality of devices may not perform a voice recognition operation for the control command. A plurality of devices may perform only a primary trigger recognition, and the specific device may perform a primary trigger recognition and a secondary trigger recognition, and may not perform a voice recognition operation associated with a control command (e.g., "please turn off").

FIG. 12 illustrates a first trigger recognition and a second trigger recognition result.

Referring to FIG. 12, a table 1205 may include results for primary trigger recognition and secondary trigger recognition. All the plurality of devices (first device, the second device, the third device, . . . , the $n^{th}$ device) may obtain the result information about the primary trigger recognition (similarity information, threshold corresponding to the primary trigger recognition, whether or not passed through the primary trigger recognition). Here, information about whether the primary trigger recognition is successful may be described as a result of recognition of the primary trigger recognition. The result information for the primary trigger recognition may be shared between a plurality of devices.

The plurality of devices may identify a device to perform a secondary trigger recognition among the plurality of devices based on the feature information. The feature information may include various information as described in FIGS. 7 to 10, but is described in FIG. 12 as a size value of user voice for convenience.

The plurality of devices may select one device based on the feature information and may perform a secondary trigger recognition in one selected device. In the embodiment, the selected one device is a first device. The first device may perform a secondary trigger recognition, and store result information (similarity information, threshold corresponding to secondary trigger recognition, whether a secondary trigger recognition is passed) for the secondary trigger recognition.

FIGS. 13 to 17 illustrate an operation performed in an example in which the secondary trigger recognition fails in a selected device (electronic apparatus 100).

Figure 13:
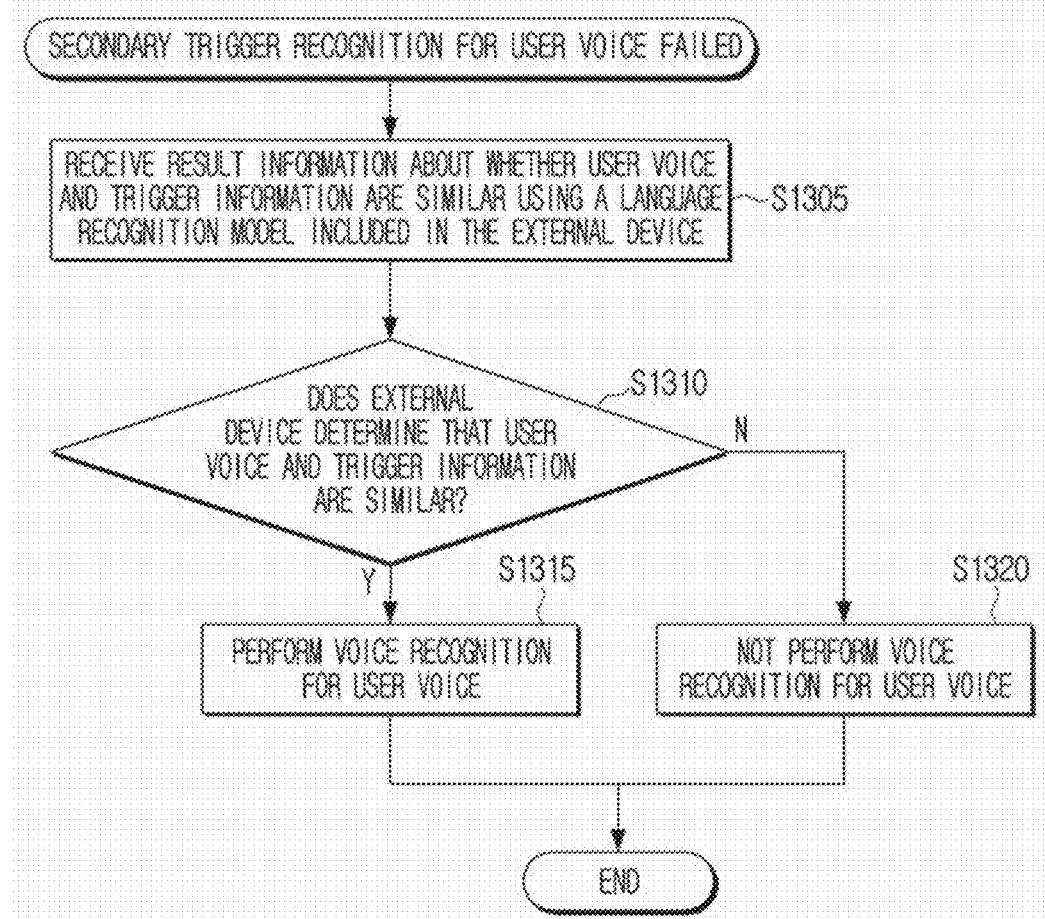

FIG. 13 is a flowchart of an embodiment of performing a voice recognition based on determination whether an external device determines that user voice and trigger information are similar.

Referring to FIG. 13, a plurality of electronic apparatuses may be the electronic apparatus 100 and the external device 200, and the selected one device may be the electronic apparatus 100.

Referring to FIG. 13, the secondary trigger recognition of the user voice is unsuccessful (or the secondary trigger recognition fails) in the electronic apparatus 100, the electronic apparatus 100 may receive the result information of the user voice and trigger information based on the language recognition model included in the external device 200 in operation S1305. Here, the language recognition model included in the external device 200 may be a model used to perform a primary trigger recognition. The result information about the similarity may refer to whether the primary trigger recognition is successful. Here, whether the primary trigger recognition is successful may be determined based on whether the similarity value is greater than or equal to a threshold value.

The electronic apparatus 100 may determine whether the external device determines that the user voice and trigger information are similar in operation S1310. The operation of the external device determining that the user voice and trigger information are similar may refer to determining whether the external device 200 has succeeded in the primary trigger recognition. If the external device 200 is successful in the primary trigger recognition, the electronic apparatus 100 may perform voice recognition for the user voice in operation S1315. If the external device 200 fails to recognize the primary trigger, the electronic apparatus 100 may not perform voice recognition corresponding to the user voice in operation S1320.

Though the electronic apparatus 100 fails the secondary trigger recognition, the electronic apparatus 100 may perform voice recognition by considering the secondary trigger recognition as being successful based on the success of the primary trigger recognition of the external device. This operation may have an effect of increasing a voice recognition success rate in response to a user voice.

Figure 14:
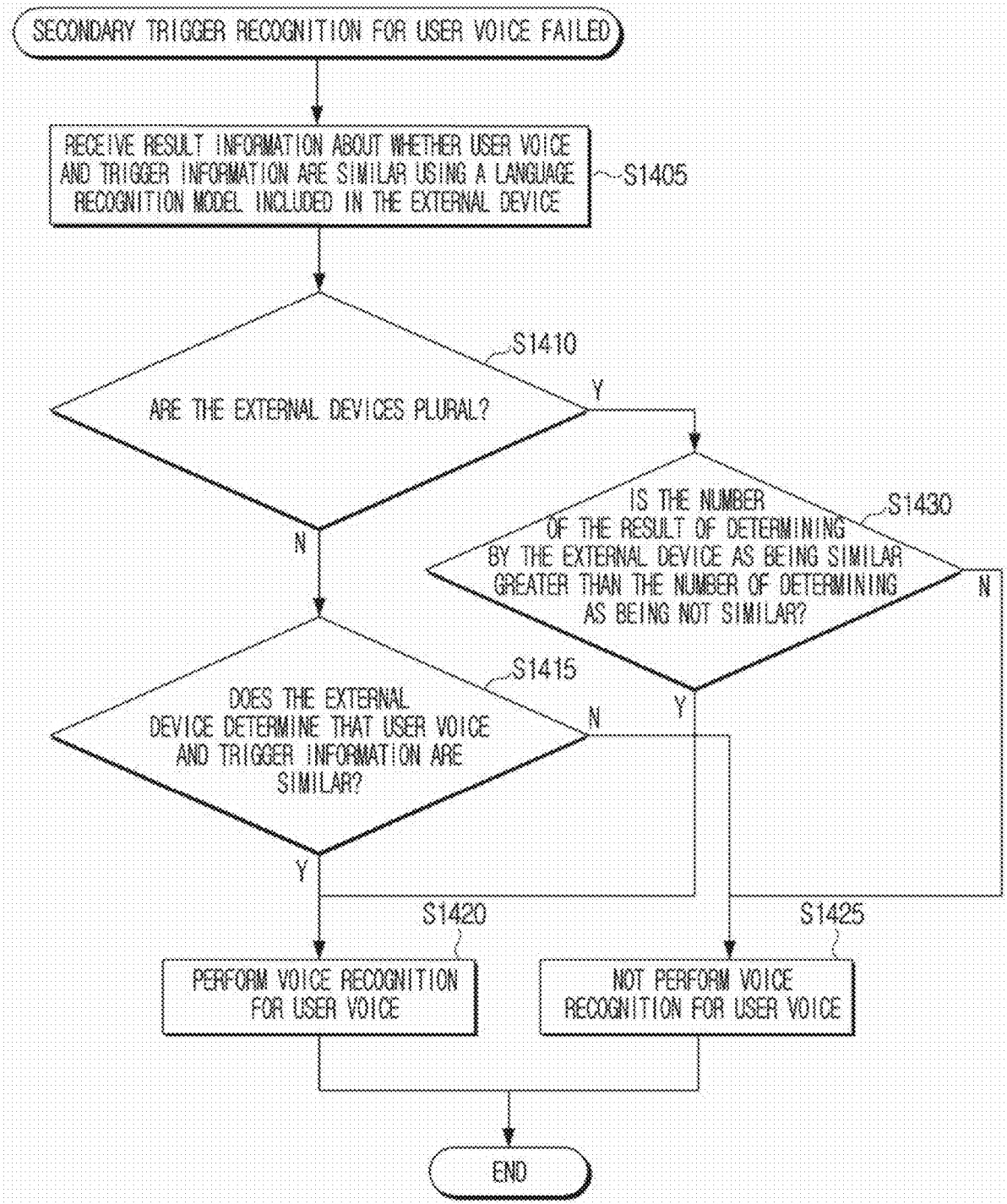

FIG. 14 is a flowchart illustrating another embodiment of performing a voice recognition based on whether an external device determines the user voice and trigger information are similar.

Referring to FIG. 14, if the user voice does not pass the secondary trigger recognition (or fails the secondary trigger recognition) in the electronic apparatus 100, the electronic apparatus 100 may receive the result information of the user voice and the trigger information based on the language recognition model included in the external device 200 in operation S1405. Since the operation S1405 corresponds to the S1305 of FIG. 13, a redundant description thereof is omitted.

The electronic apparatus 100 may determine whether multiple external devices 200 are present in operation S1410. If multiple external devices 200 are not present, the electronic apparatus 100 may identify whether the external device 200 determines that the user voice and trigger information are similar in operation S1415. If the external device 200 determines that the user voice and trigger information are similar, the electronic apparatus 100 may perform voice recognition on the user voice in operation S1420. However, if the external device 200 determines that the user voice and trigger information are not similar, the electronic apparatus 100 may not perform voice recognition on the user voice in operation S1425.

If multiple external devices are present, the electronic apparatus 100 may determine whether the number of results of determining by the external devices that the user voice is similar to the trigger information is larger than the number of results of determining by the external device that the user voice is not similar to the trigger information in operation S1430. Here, the number of results, of determining by the external devices that the user voice and trigger information are similar, may refer to the number of devices that are successful in the primary trigger recognition among the external devices. In addition, the number of results, of determining by the external devices that the user voice and trigger information are not similar, may refer to the number of devices that have failed the primary trigger recognition among the external devices.

The electronic apparatus 100 may perform voice recognition on the user voice if the number of devices, in which the primary trigger recognition is successful, is greater than the number of devices that have failed the primary trigger recognition, among the external devices in operation S1420. The electronic apparatus 100 may not perform voice recognition on the user voice if the number of devices that have successful in the primary trigger recognition, among the external devices, is not greater than (equal to or smaller) than the number of devices that have failed the primary trigger recognition in operation S1425.

For example, in operation S1430, it is assumed that there are five external devices, three external devices determine that the user voice and the trigger information are similar, and two external devices determine that the user voice and the trigger information are not similar. Because the number (three) of the devices determining that the user voice and the trigger information are similar is greater than the devices (two) determining that the user voice and the trigger information are not similar, the electronic apparatus 100 may perform voice recognition by S1420.

Figure 15:
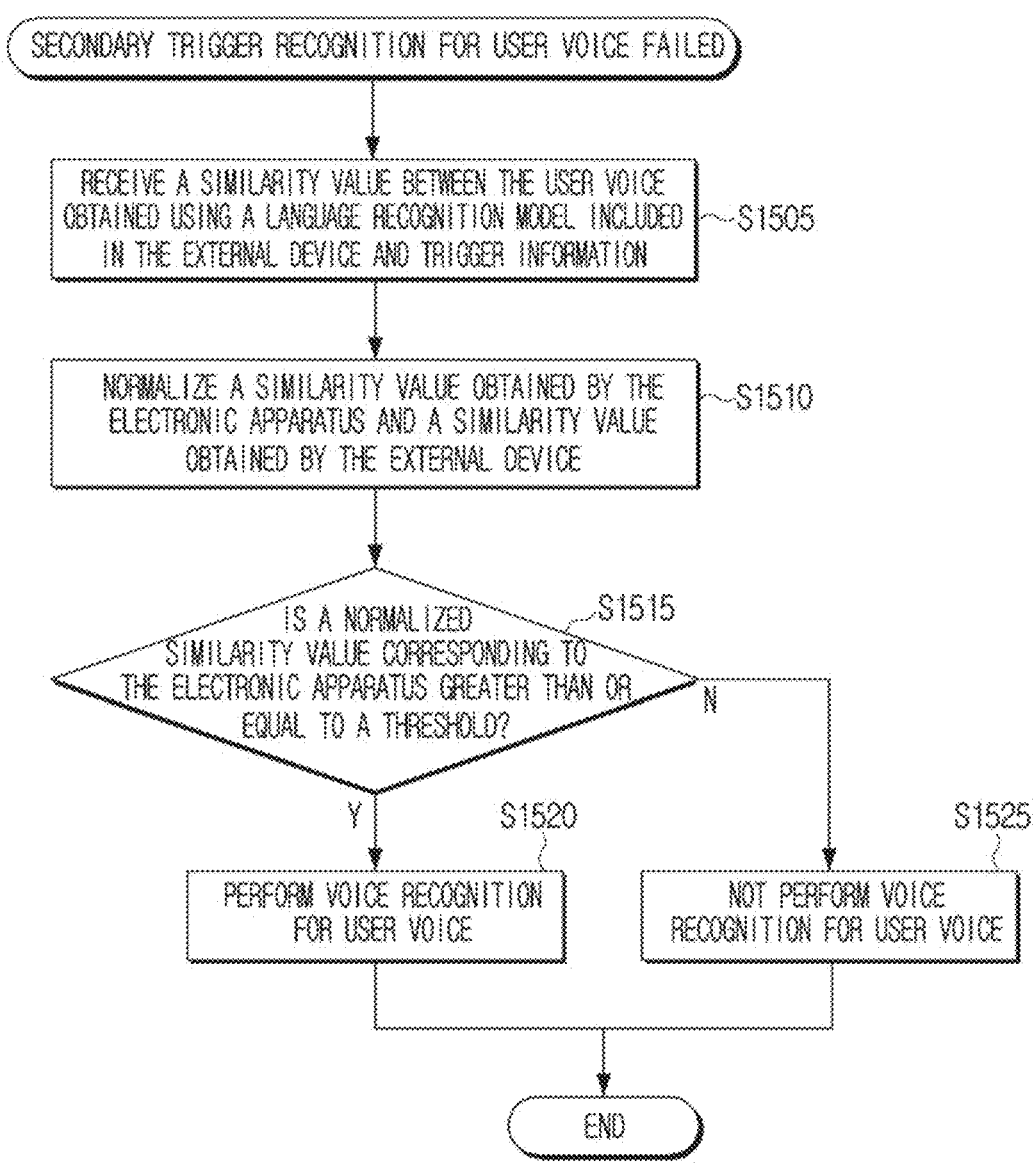
FIG. 15 illustrates a flowchart of performing a voice recognition based on a similarity value.

FIG. 15 is a flowchart illustrating an embodiment of performing a voice recognition based on a similarity value.

Referring to FIG. 15, if the secondary trigger recognition of the user voice is unsuccessful (or fails a secondary trigger recognition) in the electronic apparatus 100, the electronic apparatus 100 may receive a similarity value between the user voice obtained using a language model included in the external device (stored in the external device) and the trigger information in operation S1505.

The electronic apparatus 100 may normalize the similarity value obtained in the electronic apparatus 100 and the third similarity value obtained from the external device 200 in operation S1510. The result obtained by normalizing the first similarity value obtained in the electronic apparatus 100 is described as the normalized similarity value corresponding to the electronic apparatus 100.

The electronic apparatus 100 may determine whether the normalized similarity value corresponding to the electronic apparatus 100 is greater than or equal to a threshold in operation S1515. Here, if the normalized similarity value corresponding to the electronic apparatus 100 is equal to or greater than a threshold, the electronic apparatus 100 may perform voice recognition on the user voice in operation S1520. If the normalized similarity value corresponding to the electronic apparatus 100 is below a threshold, the electronic apparatus 100 may not perform voice recognition on the user voice in operation S1525.

If the secondary trigger recognition fails in the electronic apparatus 100, the secondary trigger recognition may be considered successful based on the similarity value received in the external device.

Figure 16:
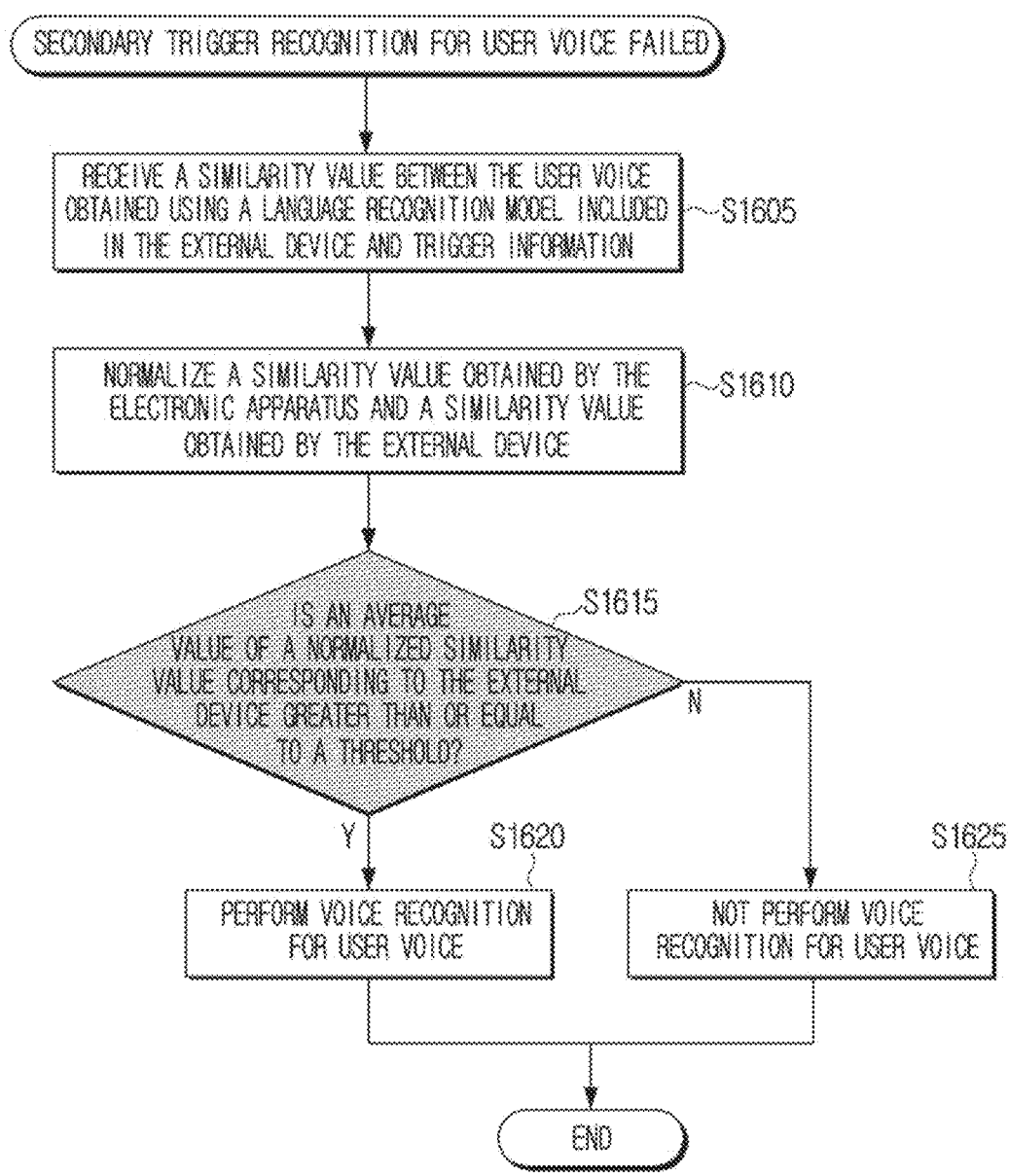
FIG. 16 illustrates a flowchart of performing a voice recognition based on a similarity value.

FIG. 16 is a flowchart illustrating another embodiment of performing a voice recognition based on a similarity value.

Referring to FIG. 16, steps S1605 and S1610 may correspond to steps S1505 and S1510 of FIG. 15, and redundant descriptions thereof will be omitted.

The electronic apparatus 100 may obtain an average value of a normalized similarity value corresponding to an external device. When only one external device is present, the average value may be a normalized similarity value corresponding to the external device.

The electronic apparatus 100 may determine whether the average value of the normalized similarity value corresponding to the external device is greater than or equal to a threshold value in operation S1615. If the average value of the normalized similarity value corresponding to the external device is equal to or greater than the threshold value, the electronic apparatus 100 may perform voice recognition on the user voice in operation S1620. However, if the average value of the normalized similarity value corresponding to the external device is less than the threshold value, the electronic apparatus 100 may not perform voice recognition on the user voice in operation S1625. When only one external device 200 is present, an average value of the normalized similarity value corresponding to the external device 200 may refer to the normalized similarity value of the external device 200. However, when multiple external devise 200 are present, the average value of the normalized similarity value corresponding to the external device 200 may refer to the average value of the similarity values of the external devices.

Although the secondary trigger recognition is unsuccessful in the electronic apparatus 100, the secondary trigger recognition may be considered successful based on the similarity value received from the external device.

Figure 17:
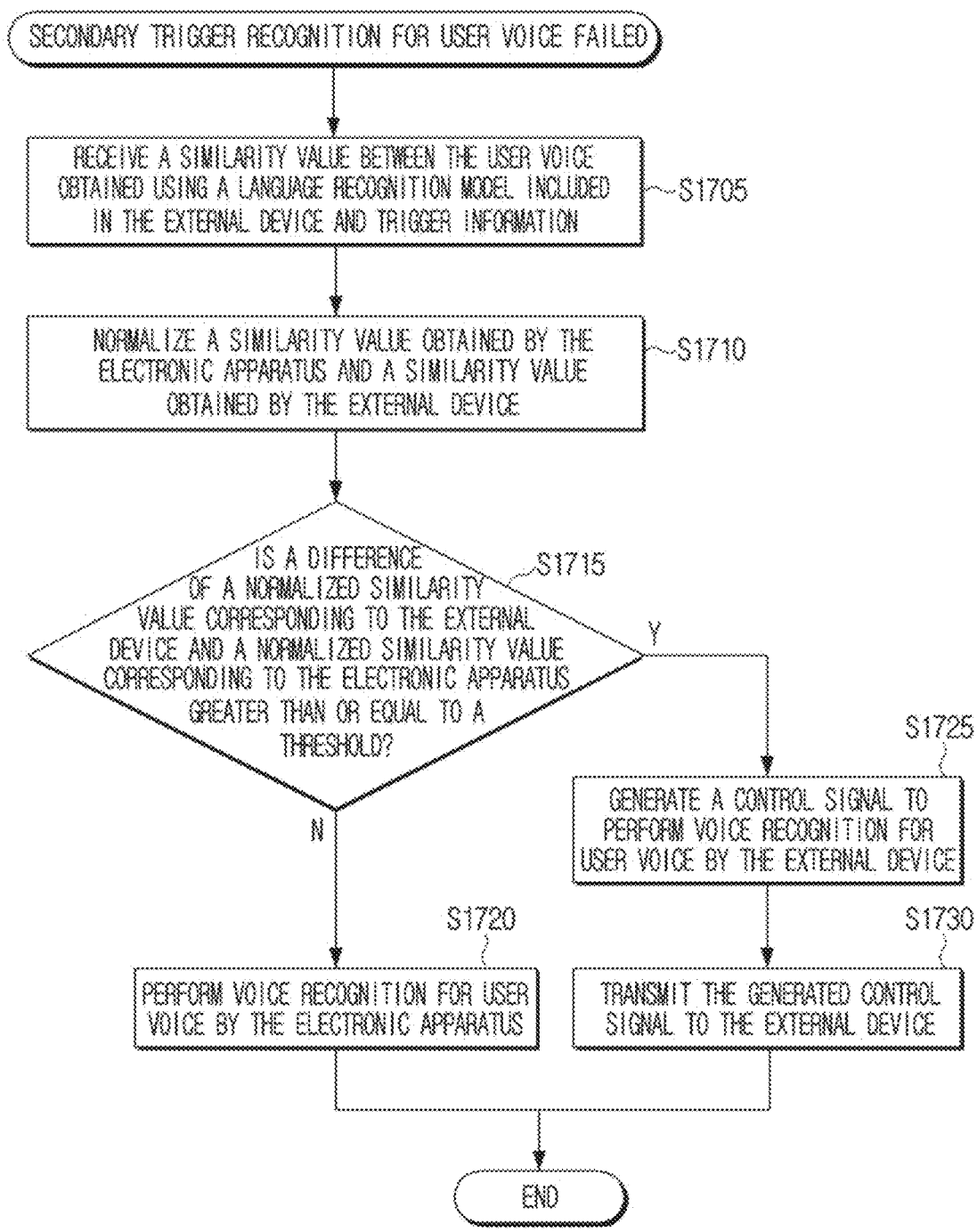
FIG. 17 illustrates a flowchart of performing a voice recognition based on a similarity value.

FIG. 17 is a flowchart illustrating an embodiment of performing a voice recognition based on a similarity value.

The electronic apparatus 100 may determine whether to perform voice recognition in the electronic apparatus 100 based on the additional determination operations (S1310, S1415, S1430, S1515, S1615) illustrated in FIGS. 13 to 16 after the secondary trigger recognition is unsuccessful. In the operations (S1320, S1425, S1525, S1625) identified as not performing voice recognition in FIGS. 13 to 16, the electronic apparatus 100 may determine whether to perform voice recognition in an external device according to an embodiment of FIG. 17.

Operations S1705 and S1710 may correspond to operations S1505 and S1510 of FIG. 15 and a redundant descriptions thereof will be omitted.

The electronic apparatus 100 may determine whether the difference between the normalized similarity value corresponding to external device 200 and the normalized similarity value corresponding to the electronic apparatus 100 is greater than or equal to than threshold in operation S1715. Here, if the external devices are plural, it is able to calculate the difference between the normalized similarity value corresponding to each of the external devices and the normalized similarity value corresponding to the electronic apparatus 100. When calculating the difference value, the electronic apparatus 100 may perform the calculation operations by "normalized similarity value corresponding to the external device 200"–"normalized similarity value corresponding to the electronic apparatus 100." If the calculated value is positive, the "normalized similarity value corresponding to the external device 200" is greater than the "normalized similarity value corresponding to the electronic apparatus 100."

If the calculated value is negative, "the normalized similarity value corresponding to the external device 200" may be less than "the normalized similarity value corresponding to the electronic apparatus 100." If the calculated value is negative, the similarity value in the electronic apparatus 100 is large and thus, the voice recognition may be performed on the electronic apparatus 100.

The electronic apparatus 100 determine whether the calculated value (positive number) is greater than or equal to a threshold if the calculated value is the positive number. The calculated value is a normalized similarity value and may be different depending on the microphone performance of each device, the language recognition model, or the like. Therefore, the threshold may be determined and applied to the S1715 operation in order to consider these errors.

The electronic apparatus 100 may further match the intention of the user to perform voice recognition in the electronic apparatus 100 rather than unnecessarily delegating voice recognition to another device in that the electronic apparatus 100 is a device identified to perform the secondary trigger recognition among the plurality of devices.

If multiple external devices are present, the electronic apparatus 100 may obtain a maximum value among the normalized similarity values corresponding to the plurality of external devices. The difference between the obtained maximum value and the normalized similarity value corresponding to the electronic apparatus 100 is greater than or equal to a threshold value may be determined. In an embodiment that the external devices are plural, the normalized similarity value corresponding to the external device 200 of S1715 may be a maximum value of the normalized similarity values corresponding to each of the plurality of external devices.

If the difference between the normalized similarity value corresponding to the external device 200 and the normalized similarity value corresponding to the electronic apparatus 100 is below the threshold, the electronic apparatus 100 may perform voice recognition on the user voice in the electronic apparatus 100 in operation S1720.

If the difference between the normalized similarity value corresponding to the external device 200 and the normalized similarity value corresponding to the electronic apparatus 100 is equal to or greater than the threshold, the electronic apparatus 100 may determine to perform voice recognition on the user voice in the external device 200 without performing voice recognition on the user voice in the electronic apparatus 100. The electronic apparatus 100 may generate a control signal to perform voice recognition on user voice in the external device 200 in operation S1725. The electronic apparatus 100 may transmit the generated control signal to the external device 200 in operation S1730.

According to an embodiment, the external device 200 may perform voice recognition on the user voice after receiving the control signal. According to another embodiment, the external device 200 may perform a secondary trigger recognition on the user voice after receiving the control signal. When the secondary trigger recognition is successful, the external device 200 may perform voice recognition on the user voice.

The electronic apparatus 100 has failed the secondary trigger recognition, but when the external device has a higher similarity value, the voice recognition rate may be increased by performing voice recognition by the external device 200 instead of the electronic apparatus 100.

The electronic apparatus 100 may be implemented in a form that the embodiment of FIG. 17 is combined with the embodiment of FIG. 14.

According to an embodiment, operations S1705 to S1730 of FIG. 17 may be performed instead of the operation S1430 of FIG. 14. When multiple external devices are present in operation S1410 of FIG. 14, the electronic apparatus 100 may perform operations S1705 to S1730. Here, operations S1705 and S1710 may be performed with operation S1405.

According to an embodiment, if the number of results of determining that the external device is similar is less than or equal to the number that the external device is not similar in operation S1430 of FIG. 14, the electronic apparatus 100 may perform operations S1705 to S1730.

According to the implementation example, operation S1720 may be replaced with voice recognition for user voice in both the electronic apparatus 100 and the plurality of external devices is not performed. Because the operation S1420 may be performed according to the determination result in operation S1430, the condition for performing voice recognition in the electronic apparatus 100 may have been already determined. Accordingly, the operation S1720 may be replaced with an operation that does not perform the voice recognition on the electronic apparatus 100 and the external device.

The embodiment of FIG. 17 and the embodiment of FIG. 15 may be implemented in a combined form. If the normalized similarity value corresponding to the electronic apparatus 100 is less than a threshold value in operation S1515 of FIG. 15, the electronic apparatus 100 may perform the steps of S1715 to S1730 of FIG. 17. In other words, the electronic apparatus 100 may perform the steps of S1715 to S1730 of FIG. 17 instead of the operation S1525.

The embodiment of FIG. 17 and the embodiment of FIG. 16 may be implemented in a combined form. If the difference between the normalized similarity value corresponding to the external device and the normalized similarity value corresponding to the electronic apparatus is less than the threshold, the electronic apparatus 100 may perform operations S1615 to S1625 of FIG. 16. That is, instead of operation S1720 of FIG. 17, operations S1615, S1620, and S1625 of FIG. 16 may be performed.

Figure 18:
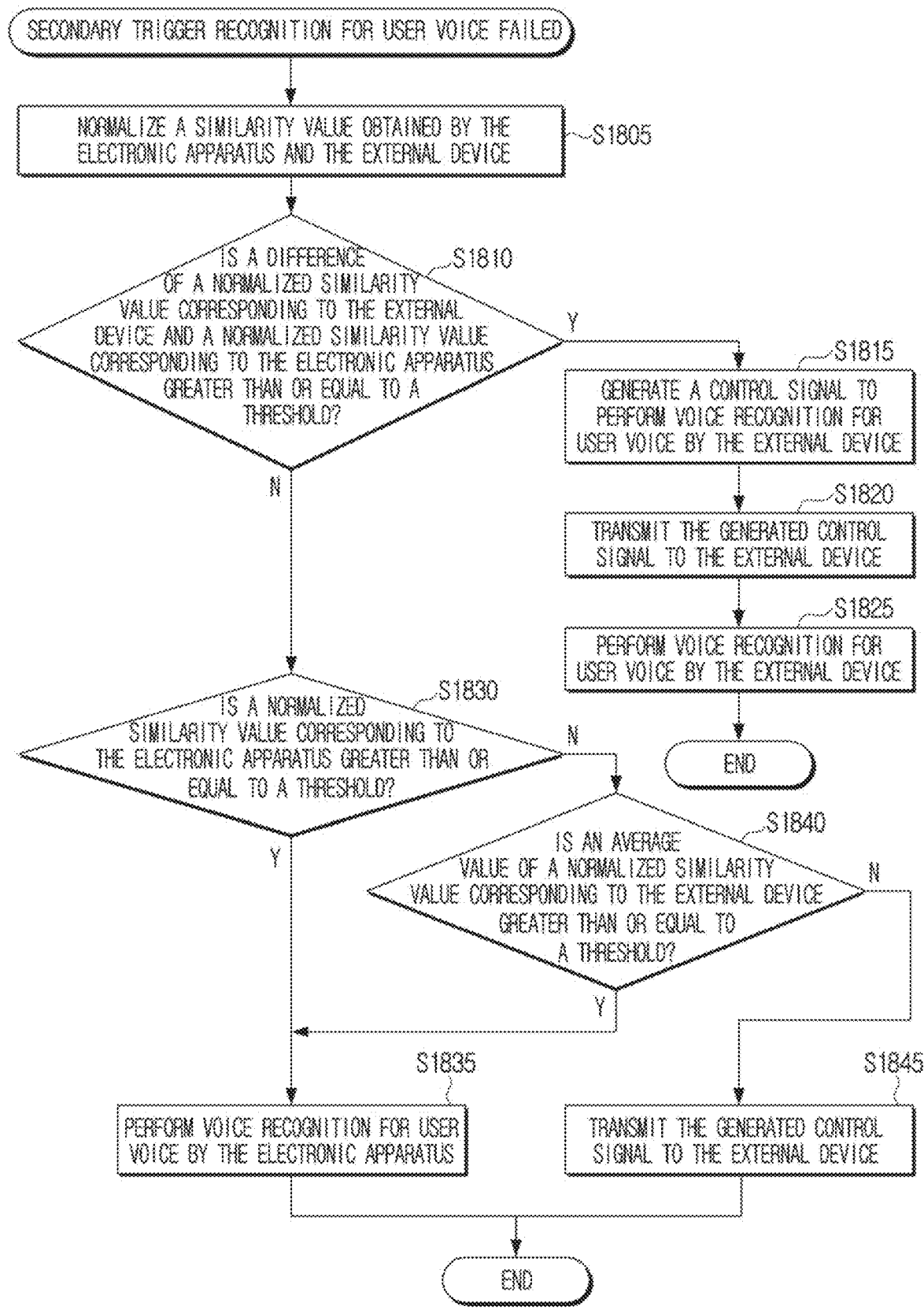
FIG. 18 illustrates a flowchart of performing a voice recognition based on a similarity value.

FIG. 18 illustrates an embodiment of performing a voice recognition based on a similarity value.

Referring to FIG. 18, the electronic apparatus 100 may normalize the similarity value obtained by the electronic apparatus 100 and the similarity value obtained by the external device 200 in operation S1805. Operation S1805 may correspond to operations S1705 and S1710 of FIG. 17. The embodiment of FIG. 18 may be a combination of the embodiments of FIGS. 15-17.

The electronic apparatus 100 may determine whether to perform the voice recognition on the user voice in the electronic apparatus 100 or the external device 200 based on the normalized value obtained in operation S1805.

The electronic apparatus 100 may determine whether the difference between the normalized similarity value corresponding to the external device 200 and the normalized similarity value corresponding to the electronic apparatus 100 is greater than or equal to a threshold in operation S1810. Operation S1810 may correspond to operation S1715 of FIG. 17.

In operation S1810, if the difference between the normalized similarity value corresponding to the external device 200 and the normalized similarity value corresponding to the electronic apparatus 100 is equal to or greater than the threshold, the electronic apparatus 100 may generate a control signal to perform voice recognition on the user voice in the external device 200 in operation 51815. The electronic apparatus 100 may transmit the generated control signal to the external device 200 in operation 51820. The external device 200 may perform voice recognition on the user voice in the external device 200 based on the received control signal in operation S1825.

If the difference between the normalized similarity value corresponding to the external device and the normalized similarity value corresponding to the electronic apparatus 100 is less than the threshold, the electronic apparatus 100 may determine whether the normalized similarity value corresponding to the electronic apparatus 100 is greater than or equal to a threshold value in operation S1830. When the normalized similarity value corresponding to the electronic apparatus 100 is equal to or greater than a threshold value, the electronic apparatus 100 may perform voice recognition on the user voice in the electronic apparatus 100 in operation S1835.

In operation S1830, if the normalized similarity value corresponding to the electronic apparatus 100 is less than a threshold, the electronic apparatus 100 may determine whether the average value of the normalized similarity value corresponding to the external device 200 is greater than or equal to a threshold value in operation S1840. Here, when a single external device 200 is present, an average value of the normalized similarity value corresponding to the external device 200 may refer to the normalized similarity value of the external device 200. However, when multiple external devices 200 are present, the average value of the similarity value corresponding to the external devices 200 may refer to the average value of the similarity values of the external devices.

In operation S1840, if the average value of the normalized similarity value corresponding to the external device 200 is equal to or greater than a threshold, the electronic apparatus 100 may perform voice recognition on the user voice in the electronic apparatus 100 in operation S1835. However, if the average value of the normalized similarity value corresponding to the external device 200 is below the threshold, the electronic apparatus 100 may determine that the electronic apparatus 100 does not perform voice recognition for the user voice in operation S1845.

Figure 19:
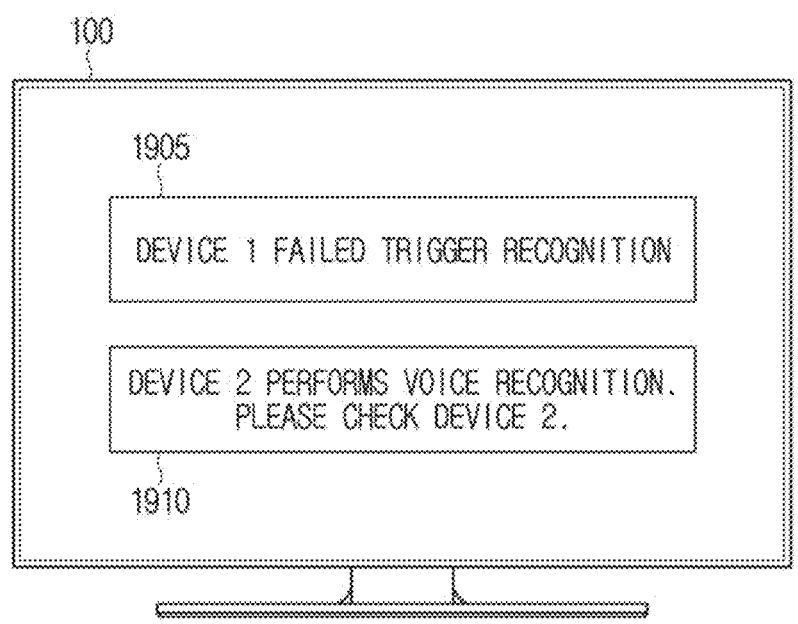
FIG. 19 illustrates a user interface (UI) displayed when a trigger recognition fails.

FIG. 19 illustrates a user interface (UI) displayed when a trigger recognition fails.

Referring to FIG. 19, when the electronic apparatus 100 fails the secondary trigger recognition, the electronic apparatus 100 may provide a UI 1905 indicating the success of the primary trigger recognition. The UI 1905 for informing the success of the secondary trigger recognition is not provided in the step in which the secondary trigger recognition is performed, and when the external device 200 transmits a control signal to perform a trigger recognition (or voice recognition), the UI 1905 may be provided.

When performing operations S1725 and S1730 of FIG. 17, a UI 1910 indicating that the voice recognition is performed in the external device 200.

When a UI indicating which device performs trigger recognition and whether the trigger recognition is successful is provided, the user may easily control a plurality of devices.

Figure 20:
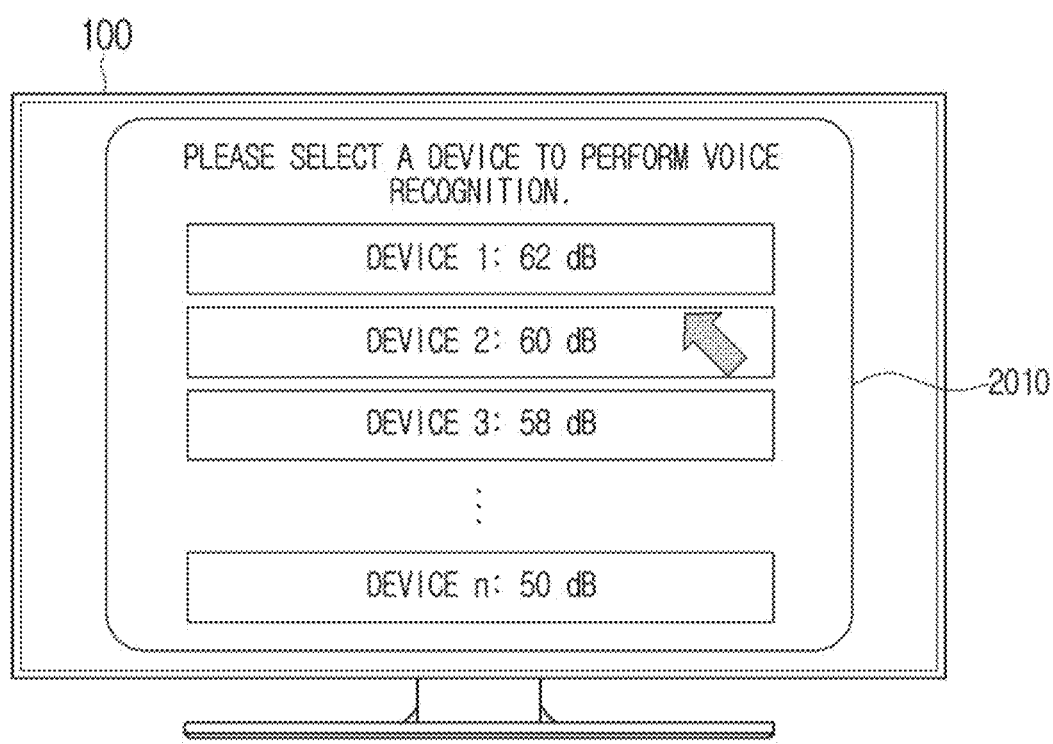
FIG. 20 illustrates a user interface (UI) displayed when a trigger recognition fails.

FIG. 20 illustrates a user interface (UI) displayed when a trigger recognition fails.

Referring to FIG. 20, when the user voice fails the secondary trigger recognition in the electronic apparatus 100, the electronic apparatus 100 may provide a UI 2010 to guide the electronic apparatus 100 to determine whether to perform voice recognition on one of the other external devices including the electronic apparatus 100.

Specifically, if the secondary trigger recognition fails, either the electronic apparatus 100 and the external devices may not react with the voice recognition. The electronic apparatus 100 may provide a guide UI for identifying a user's intention to increase the voice recognition rate. When the user is to select a device for performing voice recognition among a plurality of devices, the electronic apparatus 100 may recognize that the user requires voice recognition. If the user does not attempt to recognize the voice, such as the secondary trigger recognition failure, the user may press the end button in the UI 2010 to indicate that the user does not want voice recognition to the electronic apparatus 100.

Figure 21:
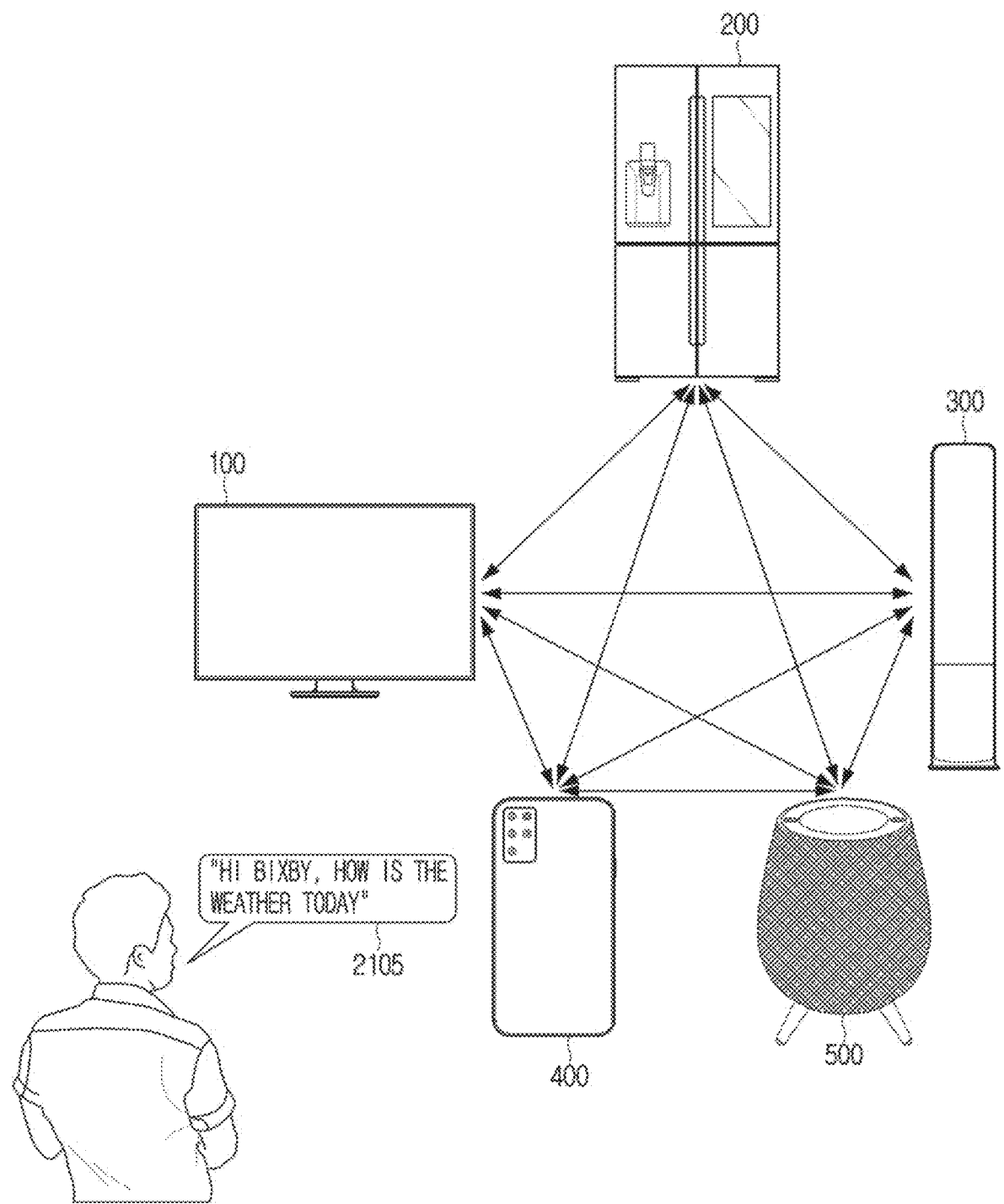
FIG. 21 illustrates a diagram of performing a control command by a plurality of devices.

FIG. 21 illustrates a diagram of performing a control command by a plurality of devices.

Referring to FIG. 21, the electronic apparatus 100 according to an embodiment may receive a user voice (or user command) for controlling an unspecific device. The user sound to control the unspecific device may be a command that does not specify which device is to perform an operation corresponding to a user voice in any of the plurality of devices 100 to 500.

It is assumed that the user voice 2105 is "hi bixby, how is the weather today?" Here, the trigger may be "hi bixby" and the control command may be "how is the weather today?." The control command inquiring about the weather does not necessarily need to be performed on a specific device. The plurality of devices 100 to 500 may receive a user voice which does not specifically limit the control object, and may perform a primary trigger recognition based on the received user voice.

The plurality of devices 100 to 500 may identify the device to perform the secondary trigger recognition by further considering the control command in addition to the trigger in performing the primary trigger recognition. Here, the device for performing the secondary trigger recognition may be a device identified by the operation S706 of FIG. 7. Specifically, the plurality of devices 100 to 500 may receive the user voice and determine whether the control command included in the received user voice may be performed in each of the plurality of devices 100 to 500, respectively. If the device receiving the user voice may not perform the operation corresponding to the control command included in the user voice, the primary trigger recognition may not be performed. If the operation corresponding to the control command may not be performed, the trigger recognition operation may not be performed because the trigger recognition does not need to be performed. The more devices that do not perform the trigger recognition operation among the plurality of devices 100 to 500, the greater then calculation speed and the less calculation processing is required.

Each of the plurality of devices 100 to 500 may identify whether to perform an operation (providing today's weather) corresponding to the control command included in a received user voice. A display or a speaker may be needed to provide information on weather. If the device receiving the user voice does not include a display or a speaker, the device receiving the user voice may not perform the primary trigger recognition. The device receiving the user voice may transmit to at least one of the other devices information indicating that the primary trigger recognition is not performed. When the device receiving the user voice includes a display or a speaker, the device receiving the user voice may perform a primary trigger recognition. If all of the devices 100 to 500 include at least one of a speaker or a display, all of the plurality of devices 100 to 500 may perform primary trigger recognition.

Figure 22:
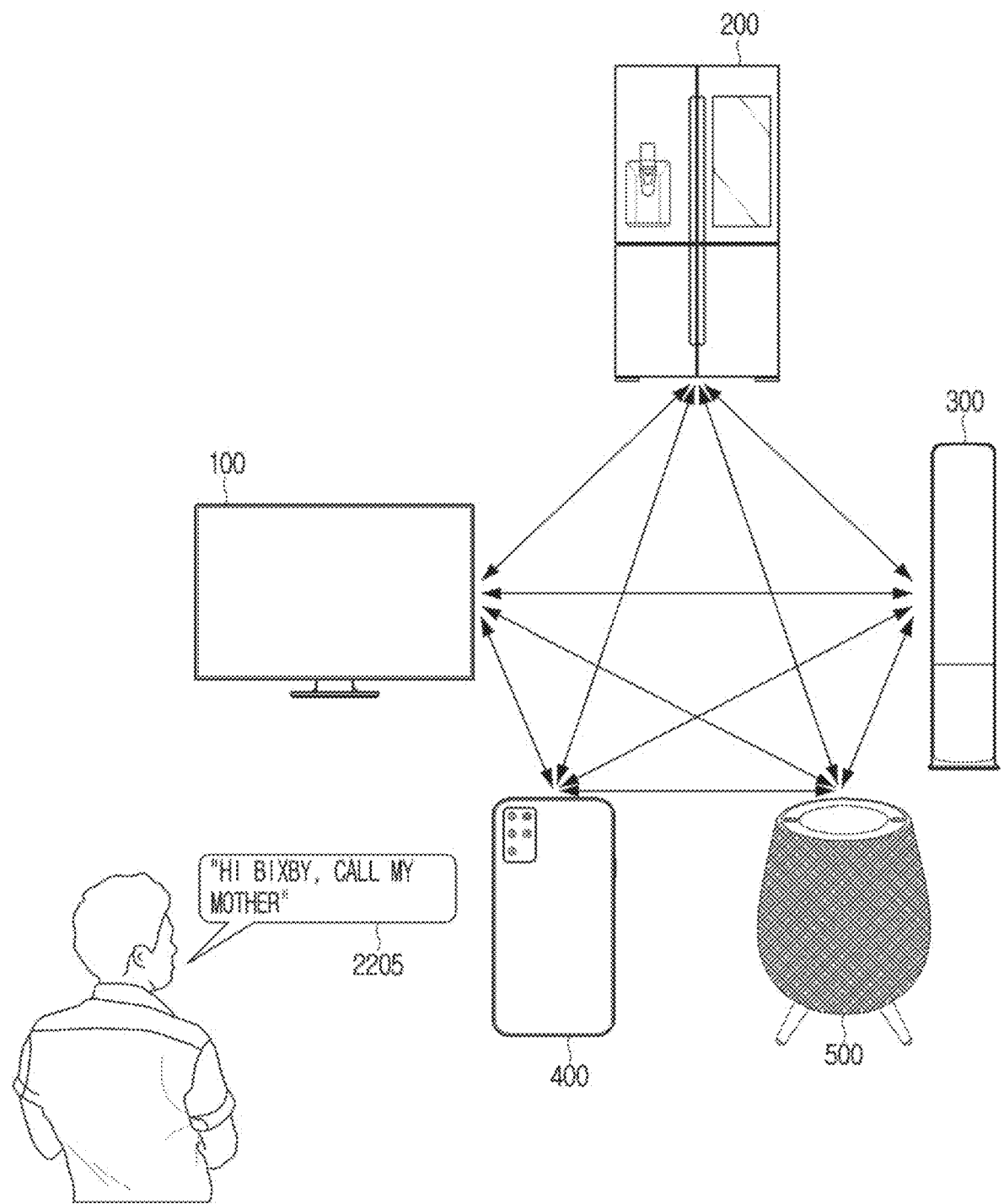
FIG. 22 illustrates a diagram of performing a control command by one device.

FIG. 22 illustrates a diagram of performing a control command by one device.

Referring to FIG. 22, the electronic apparatus 100 according to one embodiment may receive user voice (or user commands) for controlling a particular device. The user voice for controlling a particular device may be a voice that controls a device intended by a user as a control object to perform an operation corresponding to the user voice, among a plurality of devices 100 to 500.

It is assumed that the user voice 2205 is "hi bixby, call my mother." Here, the trigger may be "hi bixby" and the control command may be "call my mother." The device capable of performing an operation corresponding to a control command to make a call to an opposite party (mother) may be limited. For example, a device having a telephone function among a plurality of devices 100 to 500 is only a third external device 400. The plurality of devices 100 to 500 may receive a user voice including a control command capable of performing only in a specific device, and perform a primary trigger recognition based on the received user voice.

The plurality of devices 100 to 500 may determine the device to perform the secondary trigger recognition by further considering the control command in addition to the trigger in performing the primary trigger recognition. A detailed description is described above with respect to FIG. 20 and a redundant description will be omitted.

If the device capable of performing a telephone function among the plurality of devices 100 to 500 is only the third external device 400, the primary trigger recognition may be performed only in the third external device 400. A description will be provided based only on the electronic apparatus 100. The electronic apparatus 100 may identify a control command included in a user voice and determine whether to perform operations corresponding to the identified control commands. According to the determination result, when the electronic apparatus 100 cannot perform an operation corresponding to the control command, the electronic apparatus 100 may not perform a primary trigger recognition. The electronic apparatus 100 may transmit information indicating that the primary trigger recognition has not been performed to the other devices 200 to 500 or output the information using the hardware (display or speaker) included in the electronic apparatus 100.

Figure 23:
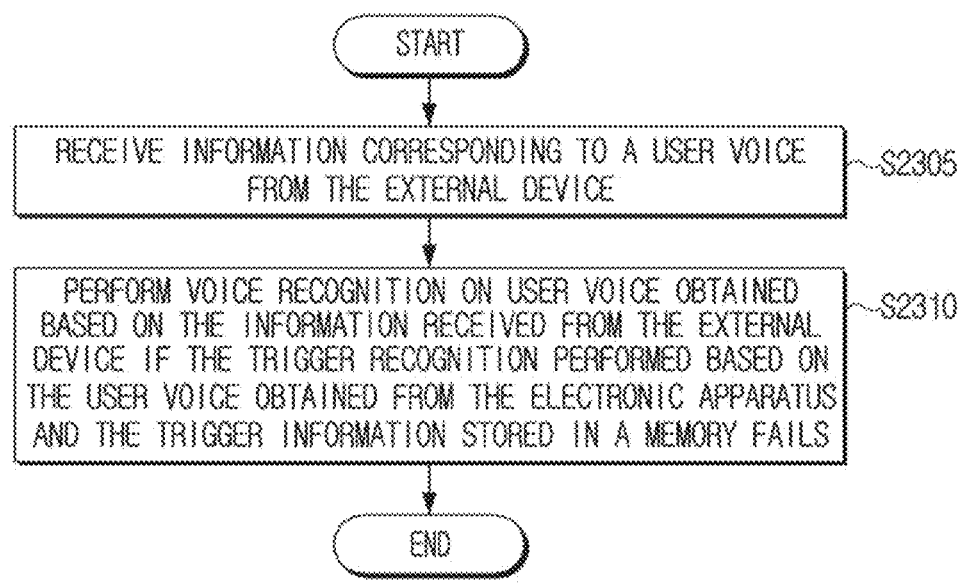
FIG. 23 illustrates a flowchart of a method of controlling an electronic apparatus according to an embodiment.

FIG. 23 is a flowchart illustrating of a method of controlling an electronic apparatus according to an embodiment.

Referring to FIG. 23, the electronic apparatus 100 according to an embodiment may receive information corresponding to a user voice from the external device 200 in operation S2305. The electronic apparatus 100 may perform voice recognition on user voice obtained based on the information received from the external device 200 if the trigger recognition performed based on the stored trigger information and the user voice obtained from the electronic apparatus 100 is unsuccessful in operation S2310.

The information received from the external device 200 may include the similarity information between the user voice obtained from the external device 200 and the trigger information.

The method may further include performing trigger recognition based on the first characteristic information of the user voice obtained in the electronic apparatus 100 and the second feature information of the user voice obtained in the external device 200. The operation of performing voice recognition in S2310 may perform voice recognition on the user voice obtained in the electronic apparatus 100 based on the information received from the external device 200 if the trigger recognition is unsuccessful.

The method may further include obtaining first similarity information between the user voice obtained by the electronic apparatus 100 and the trigger information using a first language recognition model as a primary trigger recognition result, deciding whether to perform a secondary trigger recognition based on a comparison result of the first feature information and the second feature information and the first similarity information, based on performing the secondary trigger recognition, obtaining second similarity information between the user voice obtained by the electronic apparatus 100 and the trigger information using a second language recognition model as a secondary trigger recognition result, and based on the obtained second similarity information being less than a threshold, identifying that the secondary trigger recognition fails, and the performing the voice recognition in operation S2310 may include, based on the secondary trigger recognition failing, performing a voice recognition for the user voice based on third similarity information received from the external device 200.

The first language recognition model and the second language recognition model may be different, and the control method may further include, based on the first similarity information being greater than or equal to a threshold, obtaining the second similarity information using the second language recognition model based on a comparison result between the first feature information and the second feature information.

The first language recognition model and the second language recognition models may be models of which at least one of a determination algorithm or database used to obtain similarity information between the user voice and the trigger information is different.

The third similarity information may include a similarity value between the user voice obtained by the external device 200 and the trigger information, and the performing the voice recognition in operation S2310 may include, based on the second trigger recognition failing, performing a voice recognition for the user voice based on whether the similarity value included in the third similarity information is greater than or equal to a threshold.

The first similarity information may include a first similarity value, the second similarity information comprises (or includes) a second similarity value, and the third similarity information comprises (or includes) a third similarity value, and the control method may further include normalizing the first similarity value and the third similarity value received from the external device 200, respectively, based on the second similarity value being less than a threshold, identifying that the secondary trigger recognition fails, and the performing the voice recognition in operation S2310 may include, based on the secondary trigger recognition failing, performing a voice recognition for the user voice in response to at least one of a normalized first similarity value or a normalized third similarity value being greater than or equal to a threshold.

The method may further include, based on the second similarity value being less than a threshold, and based on a third similarity value received from the external device 200 being greater than or equal to the first similarity value obtained from the electronic apparatus 100 by as threshold or more, generating a control signal to perform voice recognition for the user voice in the external device 200 and transmitting the generated control signal to the external device 200.

The generating the control signal may include, based on the control signal being generated, controlling to display a user interface (UI) including information indicating that voice recognition is performed in the external device 200.

The first feature information may be at least one of a size value of the user voice obtained by the electronic apparatus 100, an orientation angle value of the user voice for the electronic apparatus 100, or a distance value between the user voice and the electronic apparatus 100, and the second feature information may be at least one of a size value of the user voice obtained by the external device 200, an orientation angle value of the user voice for the external device 200, or a distance value between a point where the user voice is uttered and the external device 200.

The method of the electronic apparatus, as shown in FIG. 23, may be executed on an electronic apparatus having the configuration of FIG. 2 or FIG. 3, and may be executed on an electronic apparatus having other configurations.

Methods according to the embodiments as described above may be implemented as an application executable in an existing electronic apparatus.

Methods according to the embodiments as described above may be implemented as software or hardware of an electronic apparatus.

Embodiments described above may be performed through an embedded server provided in an electronic apparatus, or an external server.

Embodiments may be implemented in software, including instructions stored on machine-readable storage media readable by a machine (e.g., a computer). An apparatus may read instructions from the storage medium, and execute the instruction, including an electronic apparatus, such as electronic apparatus. When the instructions are executed by a processor, the processor may perform a function corresponding to the instructions directly or by utilizing other components under the control of the processor. The instructions may include computer-readable codes generated by a compiler or a code executable by an interpreter. A machine-readable storage medium may be provided in the form of a non-transitory storage medium, which expression denotes that a storage medium is tangible, and does not distinguish the case in which a data is semi-permanently stored in a storage medium from the case in which a data is temporarily stored in a storage medium.

The methods according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

The respective elements (e.g., module or program) mentioned above may include a single entity or a plurality of entities. At least one element or operation from of the corresponding elements mentioned above may be omitted, or at least one other element or operation may be added. Alternatively or additionally, components (e.g., module or program) may be combined to form a single entity. In this configuration, the integrated entity may perform functions of at least one function of an element of each of the plurality of elements in the same manner as or in a similar manner to that performed by the corresponding element from of the plurality of elements before integration. The module, a program module, or operations executed by other elements according to embodiments may be executed consecutively, in parallel, repeatedly, or heuristically, or at least some operations may be executed according to a different order, may be omitted, or the other operation may be added thereto.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic apparatus comprising:
  a memory;
  a communication interface; and
  a processor configured to:
    receive, from an external device through the communication interface, information corresponding to a user voice input obtained by the external device,
    perform a function corresponding to a trigger recognition on the user voice input based on trigger information corresponding to a trigger stored in the memory, and
    based on the user voice input not including the trigger corresponding to the trigger information based on the trigger recognition, perform a function corresponding to a voice recognition on the user voice input based on the information corresponding to the user voice input obtained by the external device,
    wherein the information corresponding to the user voice input obtained by the external device includes similarity information between the user voice input obtained by the external device and the trigger information.

2. The electronic apparatus of claim 1, wherein the processor is further configured to:
  perform a function corresponding to the trigger recognition based on first feature information of the user voice input obtained by the electronic apparatus and second feature information of the user voice input obtained by the external device, and
  based on the user voice input not including the trigger corresponding to the trigger information based on the trigger recognition, perform a function corresponding to the voice recognition for the user voice input obtained by the electronic apparatus based on the information received from the external device.

3. The electronic apparatus of claim 2, wherein the processor is further configured to:
  perform a function corresponding to a first trigger recognition based on the user voice input and the trigger information,
  obtain first similarity information between the user voice input obtained by the electronic apparatus and the trigger information using a first language recognition model as a result of the first trigger recognition result,
  identify whether to perform a function corresponding to a second trigger recognition based on a comparison result between the first feature information and the second feature information, and the first similarity information,
  based on performing a function corresponding to the second trigger recognition, obtain second similarity information between the user voice input obtained by the electronic apparatus and the trigger information using a second language recognition model as a result of the second trigger recognition,
  based on the obtained second similarity information being less than a threshold, determine the user voice input does not include the trigger corresponding to the trigger information, and
  based on the user voice input not including the trigger corresponding to the trigger information based on the second trigger recognition, perform a function corresponding to the voice recognition for the user voice input based on third similarity information received from the external device.

4. The electronic apparatus of claim 3, wherein the first language recognition model and the second language recognition model are different language recognition models, and
  wherein the processor is further configured to, based on the first similarity information being greater than or equal to a threshold, obtain the second similarity information using the second language recognition model based on the comparison result between the first feature information and the second feature information.

5. The electronic apparatus of claim 3, wherein the first language recognition model and the second language recognition model are models of which at least one of a determination algorithms or databases used to obtain the similarity information between the user voice input and the trigger information are different.

6. The electronic apparatus of claim 3, wherein the third similarity information comprises a similarity value between the user voice input obtained by the external device and the trigger information, and
  wherein the processor is further configured to, based on the user voice input not including the trigger corresponding to the trigger information based on the second trigger recognition, perform a function corresponding to the voice recognition on the user voice input based on whether the third similarity information is greater than or equal to a threshold.

7. The electronic apparatus of claim 3, wherein the first similarity information comprises a first similarity value, the second similarity information comprises a second similarity value, and the third similarity information comprises a third similarity value, and
  wherein the processor is further configured to:
  normalize the first similarity value and the third similarity value received from the external device,
  based on the second similarity value being less than a threshold, the user voice input not including the trigger corresponding to the trigger information, and
  based on the user voice input not including the trigger corresponding to the trigger information based on the second trigger recognition, perform a function corresponding to the voice recognition for the user voice input based on at least one of a normalized first similarity value or a normalized third similarity value being greater than or equal to a threshold.

8. The electronic apparatus of claim 7, wherein the processor is further configured to, based on the second similarity value being less than a threshold, and based on the third similarity value received from the external device being greater than or equal to the first similarity value obtained from the electronic apparatus by a threshold or more, generate a control signal to perform a function corresponding to the voice recognition for the user voice input by the external device and transmit the control signal to the external device.

9. The electronic apparatus of claim 8, further comprising:
  a display,
  wherein the processor is further configured to, based on the control signal, control the display to display a user interface (UI) including information indicating that the voice recognition is performed by the external device.

10. The electronic apparatus of claim 3, wherein the first feature information is at least one of a first size value of the user voice input obtained by the electronic apparatus, a first orientation angle value of the user voice input for the electronic apparatus, or a first distance value between the user voice input and the electronic apparatus, and
  wherein the second feature information is at least one of a second size value of the user voice input obtained by the external device, a second orientation angle value of the user voice input for the external device, or a second distance value between a point where the user voice input is uttered and the external device.

11. A method of controlling an electronic apparatus, the method comprising:
  receiving, from an external device, information corresponding to a user voice input obtained by the external device;
  performing a function corresponding to a trigger recognition on the user voice input based on trigger information corresponding to a trigger; and
  based on determining the user voice input not including the trigger corresponding to the trigger information based on the trigger recognition, performing a function corresponding to a voice recognition on the user voice input based on the information corresponding to the user voice input obtained by the external device,
  wherein the information corresponding to the user voice input obtained by the external device includes similarity information between the user voice input obtained by the external device and the trigger information.

12. The method of claim 11, further comprising:
  performing a function corresponding to the trigger recognition based on first feature information of the user voice input obtained by the electronic apparatus and second feature information of the user voice input obtained by the external device,
  wherein performing a function corresponding to the voice recognition comprises, based on the user voice input not including the trigger corresponding to the trigger information based on the trigger recognition, performing the voice recognition for the user voice input obtained by the electronic apparatus based on the information received from the external device.

13. The method of claim 12, further comprising:
performing a function corresponding to a first trigger recognition based on the user voice input and the trigger information,
obtaining first similarity information between the user voice input obtained by the electronic apparatus and the trigger information using a first language recognition model as a result of the first trigger recognition result;
deciding whether to perform a function corresponding to a second trigger recognition based on a comparison result between the first feature information and the second feature information, and the first similarity information;
based on performing a function corresponding to the second trigger recognition, obtaining second similarity information between the user voice input obtained by the electronic apparatus and the trigger information using a second language recognition model as a result of the second trigger recognition;
based on the second similarity information being less than a threshold, the user voice input not including the trigger corresponding to the trigger information; and
based on the user voice input not including the trigger corresponding to the trigger information based on the second trigger recognition, performing a function corresponding to the voice recognition for the user voice input based on third similarity information received from the external device.

14. The method of claim 13, wherein the first language recognition model and the second language recognition model are different language recognition models, and
wherein the method further comprises, based on the first similarity information being greater than or equal to a threshold, obtaining the second similarity information using the second language recognition model based on the comparison result between the first feature information and the second feature information.

15. The method of claim 13, wherein the first language recognition model and the second language recognition model are models of which at least one of a determination algorithms or databases used to obtain the similarity information between the user voice input and the trigger information are different.

16. The method of claim 13, wherein the third similarity information comprises a similarity value between the user voice input obtained by the external device and the trigger information, and
wherein performing a function corresponding to the voice recognition comprises, based on the user voice input not including the trigger corresponding to the trigger information based on the second trigger recognition, performing a function corresponding to the voice recognition on the user voice input based on whether the third similarity information is greater than or equal to a threshold.

17. The method of claim 13, wherein the first similarity information comprises a first similarity value, the second similarity information comprises a second similarity value, and the third similarity information comprises a third similarity value,
wherein the method further comprises:
normalizing the first similarity value and the third similarity value received from the external device;
based on the second similarity value being less than a threshold, the user voice input not including the trigger corresponding to the trigger information,
wherein performing a function corresponding to the voice recognition comprises, based on the user voice input not including the trigger corresponding to the trigger information based on the second trigger recognition, performing a function corresponding to the voice recognition for the user voice input based on at least one of a normalized first similarity value or a normalized third similarity value being greater than or equal to a threshold.

18. The method of claim 17, further comprising:
based on the second similarity value being less than a threshold, and based on the third similarity value received from the external device being greater than or equal to the first similarity value obtained from the electronic apparatus by a threshold or more, generating a control signal to perform a function corresponding to the voice recognition for the user voice input by the external device; and
transmitting the control signal to the external device.

19. The method of claim 18, wherein the generating the control signal comprises, based on the control signal, controlling to display a user interface (UI) including information indicating that the voice recognition is performed by the external device.

20. The method of claim 13, wherein the first feature information is at least one of a first size value of the user voice input obtained by the electronic apparatus, a first orientation angle value of the user voice input for the electronic apparatus, or a first distance value between the user voice input and the electronic apparatus, and
wherein the second feature information is at least one of a second size value of the user voice input obtained by the external device, a second orientation angle value of the user voice input for the external device, or a second distance value between a point where the user voice input is uttered and the external device.

* * * * *